US008768830B1

(12) United States Patent
Jorgensen et al.

(10) Patent No.: US 8,768,830 B1
(45) Date of Patent: Jul. 1, 2014

(54) METHOD AND SYSTEM FOR A MULTI-PURPOSE TRANSACTIONAL PLATFORM

(75) Inventors: Marty Jorgensen, Sioux Falls, SD (US); Michael Moss, Northport, NY (US); Eziah Syed, New York, NY (US)

(73) Assignee: Citibank, N.A., New York, NY (US)

( * ) Notice: Subject to any disclaimer, the term of this patent is extended or adjusted under 35 U.S.C. 154(b) by 127 days.

(21) Appl. No.: 13/227,508

(22) Filed: Sep. 8, 2011

(51) Int. Cl.
*G06Q 40/00* (2012.01)

(52) U.S. Cl.
USPC .............................................. 705/39; 705/40

(58) Field of Classification Search
USPC ................................................... 705/35–40
See application file for complete search history.

(56) References Cited

U.S. PATENT DOCUMENTS

| | | | |
|---|---|---|---|
| 3,376,661 A | 4/1968 | Hulett | 40/2 |
| 3,399,473 A | 9/1968 | Jaffe | 40/2 |
| 4,091,448 A | 5/1978 | Clausing | 364/200 |
| 4,443,027 A | 4/1984 | McNeely | 283/83 |
| 4,634,848 A | 1/1987 | Shinohara et al. | 235/449 |
| 4,700,055 A | 10/1987 | Kashkashian, Jr. | 235/379 |
| 4,701,601 A | 10/1987 | Francini et al. | 235/449 |
| 4,707,594 A | 11/1987 | Roth | 235/488 |
| 4,766,293 A | 8/1988 | Boston | 705/41 |
| 4,797,542 A | 1/1989 | Hara | 235/380 |
| 4,837,422 A | 6/1989 | Dethloff et al. | 235/380 |
| 4,879,455 A | 11/1989 | Butterworth et al. | 235/380 |
| 4,918,631 A | 4/1990 | Hara | 364/708 |
| 4,973,828 A | 11/1990 | Naruse et al. | 235/380 |
| 5,025,372 A | 6/1991 | Burton et al. | 705/14 |
| 5,130,519 A | 7/1992 | Bush et al. | 235/380 |
| 5,180,902 A | 1/1993 | Schick et al. | 235/380 |
| 5,221,838 A | 6/1993 | Gutman et al. | 235/379 |
| 5,265,162 A | 11/1993 | Bush et al. | 705/67 |
| 5,272,319 A | 12/1993 | Rey | 235/379 |
| 5,276,311 A | 1/1994 | Hennige | 235/380 |
| 5,317,636 A | 5/1994 | Vizcaino | 705/65 |
| 5,326,964 A | 7/1994 | Risser | 235/487 |
| 5,357,563 A | 10/1994 | Hamilton et al. | 379/91 |

(Continued)

FOREIGN PATENT DOCUMENTS

| | | |
|---|---|---|
| DE | 29713674 | 9/1997 |
| JP | 3258596 | 11/1991 |

(Continued)

OTHER PUBLICATIONS

"Plastic Card Industry Faces a Forked Road: User Security and Services Will Steer Course of Electronic Funds Transfer," American Banker, Sep. 10, 1984, p. 10, Michael Weinstein.

(Continued)

*Primary Examiner* — Thu Thao Havan
(74) *Attorney, Agent, or Firm* — Eric L. Sophir; Dentons US LLP

(57) ABSTRACT

Methods and systems described herein can consolidate a plurality of a consumer's payment and non-payment source accounts into a consolidated platform with a customer identification or available proxy account numbers that can be assigned to source accounts. The source accounts can be, for example, credit card accounts, ATM accounts, debit card accounts, demand deposit accounts, stored-value accounts, merchant-loyalty card accounts, membership accounts, and identification card numbers. The consumer can access and modify any of the source accounts and manage funds across the source accounts by accessing the consolidated platform with a single access device or mode.

17 Claims, 13 Drawing Sheets

(56) References Cited

U.S. PATENT DOCUMENTS

| | | | |
|---|---|---|---|
| 5,530,232 A | 6/1996 | Taylor | 235/380 |
| 5,544,246 A | 8/1996 | Mandelbaum | 380/23 |
| 5,574,269 A | 11/1996 | Mori et al. | 235/380 |
| 5,578,808 A | 11/1996 | Taylor | 235/380 |
| 5,585,787 A | 12/1996 | Wallerstein | 340/825 |
| 5,590,038 A | 12/1996 | Pitroda | 395/241 |
| 5,627,355 A | 5/1997 | Rahman et al. | 235/380 |
| 5,689,100 A | 11/1997 | Carrithers et al. | 235/380 |
| 5,770,843 A | 6/1998 | Rose et al. | 235/380 |
| 5,794,234 A | 8/1998 | Church et al. | 707/4 |
| 5,844,230 A | 12/1998 | Lalonde | 235/487 |
| 5,859,419 A | 1/1999 | Wynn | 235/487 |
| 5,883,377 A | 3/1999 | Chapin, Jr. | 235/493 |
| 5,907,142 A | 5/1999 | Kelsey | 235/380 |
| 5,913,203 A | 6/1999 | Wong et al. | 705/39 |
| 5,923,016 A | 7/1999 | Fredregill et al. | 235/380 |
| 5,937,394 A | 8/1999 | Wong et al. | 705/26 |
| 5,955,961 A | 9/1999 | Wallerstein | 340/54 |
| 5,956,695 A | 9/1999 | Carrithers et al. | 705/14 |
| 5,956,699 A | 9/1999 | Wong et al. | 705/39 |
| 6,000,608 A | 12/1999 | Dorf | 235/380 |
| 6,012,636 A | 1/2000 | Smith | 235/380 |
| 6,014,635 A | 1/2000 | Harris et al. | 705/14 |
| 6,019,284 A | 2/2000 | Freeman et al. | 235/380 |
| 6,024,286 A | 2/2000 | Bradley | 235/492 |
| 6,032,136 A | 2/2000 | Brake, Jr. | 705/41 |
| 6,042,009 A | 3/2000 | Barrett et al. | 235/441 |
| 6,055,635 A | 4/2000 | Karlsson | 713/184 |
| 6,089,451 A | 7/2000 | Krause | 235/380 |
| 6,095,416 A | 8/2000 | Grant | 235/449 |
| 6,131,811 A | 10/2000 | Gangi | 235/380 |
| 6,138,911 A | 10/2000 | Fredregill et al. | 235/383 |
| 6,182,895 B1 | 2/2001 | Albrecht | 235/380 |
| 6,188,309 B1 | 2/2001 | Levine | 340/5 |
| 6,189,787 B1 | 2/2001 | Dorf | 235/380 |
| 6,266,647 B1 | 7/2001 | Fernandez | 705/14 |
| 6,267,292 B1 | 7/2001 | Walker et al. | 235/379 |
| 6,293,462 B1 | 9/2001 | Gangi | 235/380 |
| 6,325,293 B1 | 12/2001 | Moreno | 235/492 |
| 6,398,115 B2 | 6/2002 | Krause | 235/492 |
| 6,402,026 B1 | 6/2002 | Schwier | 235/379 |
| 6,402,029 B1 | 6/2002 | Gangi | 235/380 |
| 6,427,909 B1 | 8/2002 | Barnes | 235/380 |
| 6,494,367 B1 | 12/2002 | Zacharias | 235/382 |
| 6,592,044 B1 | 7/2003 | Wong et al. | 235/380 |
| 6,594,640 B1 | 7/2003 | Postrel | 705/14 |
| 6,601,761 B1 | 8/2003 | Katis | 235/379 |
| 6,607,127 B2 | 8/2003 | Wong | 235/451 |
| 6,609,654 B1 | 8/2003 | Anderson et al. | 235/379 |
| 6,641,050 B2 | 11/2003 | Kelley et al. | 235/492 |
| 6,685,088 B1 | 2/2004 | Royer et al. | 235/380 |
| 6,702,181 B2 | 3/2004 | Ramachandran | 235/380 |
| 6,755,341 B1 | 6/2004 | Wong et al. | 235/380 |
| 6,805,288 B2 | 10/2004 | Routhenstein et al. | 235/380 |
| 6,811,082 B2 | 11/2004 | Wong | 235/451 |
| 6,820,061 B2 | 11/2004 | Postrel | 705/14 |
| 6,829,586 B2 | 12/2004 | Postrel | 705/14 |
| 6,842,739 B2 | 1/2005 | Postrel | 705/14 |
| 6,847,935 B1 | 1/2005 | Solomon et al. | 705/14 |
| 6,889,198 B2 | 5/2005 | Kawan | 705/14 |
| 6,947,898 B2 | 9/2005 | Postrel | 705/14 |
| 7,044,368 B1 | 5/2006 | Barron | 235/380 |
| 7,051,929 B2 | 5/2006 | Li | 235/380 |
| 7,054,830 B1 | 5/2006 | Eggleston et al. | 705/14 |
| 7,083,087 B1 | 8/2006 | Gangi | 235/380 |
| 7,090,138 B2 | 8/2006 | Rettenmyer et al. | 235/493 |
| 7,096,190 B2 | 8/2006 | Postrel | 705/14 |
| 7,163,153 B2 | 1/2007 | Blossom | 235/492 |
| 7,191,952 B2 | 3/2007 | Blossom | 235/492 |
| 7,195,154 B2 | 3/2007 | Routhenstein | 235/380 |
| 7,263,507 B1 | 8/2007 | Brake, Jr. et al. | 705/41 |
| 7,328,850 B2 | 2/2008 | Sines | 235/492 |
| 7,413,113 B1 | 8/2008 | Zhu | 35/375 |
| 7,424,441 B2 | 9/2008 | George et al. | 705/14 |
| 7,503,485 B1 | 3/2009 | Routhenstein | 235/380 |
| 7,506,804 B2 | 3/2009 | Zajkowski et al. | 235/380 |
| 7,533,828 B2 | 5/2009 | Ong | 35/492 |
| 7,543,741 B2 | 6/2009 | Lovett | 235/380 |
| 7,562,810 B2 | 7/2009 | Rao et al. | 235/375 |
| 7,578,431 B2 | 8/2009 | Tanner et al. | 235/375 |
| 7,580,898 B2 | 8/2009 | Brown et al. | 705/75 |
| 7,584,153 B2 | 9/2009 | Brown et al. | 705/75 |
| 7,591,416 B2 | 9/2009 | Blossom | 235/380 |
| 7,597,255 B2 | 10/2009 | Deane et al. | 235/383 |
| 7,606,730 B2 | 10/2009 | Antonucci | 705/14 |
| 7,784,687 B2 | 8/2010 | Mullen et al. | 235/380 |
| 7,793,851 B2 | 9/2010 | Mullen | 235/493 |
| 7,828,220 B2 | 11/2010 | Mullen | 235/492 |
| 7,931,195 B2 | 4/2011 | Mullen | 235/380 |
| 7,954,705 B2 | 6/2011 | Mullen | 235/380 |
| 2001/0001204 A1 | 5/2001 | Campisano | 235/380 |
| 2001/0016827 A1 | 8/2001 | Fernandez | 705/14 |
| 2001/0032134 A1 | 10/2001 | Hardesty | 705/14 |
| 2001/0054003 A1 | 12/2001 | Chien et al. | 705/14 |
| 2002/0003169 A1 | 1/2002 | Cooper | 235/492 |
| 2002/0019772 A1 | 2/2002 | Hillier et al. | 705/14 |
| 2002/0026418 A1 | 2/2002 | Koppel et al. | 705/41 |
| 2002/0029191 A1 | 3/2002 | Ishibashi | 705/39 |
| 2002/0032607 A1 | 3/2002 | Kuwahara | 705/14 |
| 2002/0055909 A1 | 5/2002 | Fung et al. | 705/42 |
| 2002/0123926 A1 | 9/2002 | Bushold et al. | 705/14 |
| 2002/0152123 A1 | 10/2002 | Giordano et al. | 705/14 |
| 2002/0161630 A1 | 10/2002 | Kern et al. | 705/14 |
| 2002/0174055 A1 | 11/2002 | Dick et al. | 705/37 |
| 2002/0188501 A1 | 12/2002 | Lefkowith | 705/14 |
| 2002/0188511 A1 | 12/2002 | Johnson et al. | 705/14 |
| 2002/0198803 A1 | 12/2002 | Rowe | 705/35 |
| 2003/0083933 A1 | 5/2003 | McAlear | 705/14 |
| 2003/0088462 A1 | 5/2003 | Carrithers et al. | 705/14 |
| 2003/0115100 A1 | 6/2003 | Teicher | 705/14 |
| 2003/0149625 A1 | 8/2003 | Leonardi et al. | 705/14 |
| 2003/0171992 A1 | 9/2003 | Blagg et al. | 705/14 |
| 2003/0220834 A1 | 11/2003 | Leung et al. | 705/14 |
| 2003/0225618 A1 | 12/2003 | Hessburg et al. | 705/14 |
| 2003/0229539 A1 | 12/2003 | Algiene | 705/14 |
| 2004/0030601 A1 | 2/2004 | Pond et al. | 705/16 |
| 2004/0122736 A1 | 6/2004 | Strock et al. | 705/14 |
| 2004/0186770 A1 | 9/2004 | Pettit et al. | 705/14 |
| 2004/0230483 A1 | 11/2004 | Kepecs | 705/14 |
| 2004/0238622 A1 | 12/2004 | Freiberg | 235/380 |
| 2005/0021399 A1 | 1/2005 | Postrel | 705/14 |
| 2005/0021401 A1 | 1/2005 | Postrel | 705/14 |
| 2005/0043997 A1 | 2/2005 | Sahota et al. | 705/16 |
| 2005/0067485 A1 | 3/2005 | Caron | 235/380 |
| 2005/0077348 A1 | 4/2005 | Hendrick | 235/380 |
| 2005/0077350 A1 | 4/2005 | Courtion et al. | 235/380 |
| 2005/0080672 A1 | 4/2005 | Courtion et al. | 705/14 |
| 2005/0082362 A1 | 4/2005 | Anderson et al. | 235/380 |
| 2005/0086103 A1 | 4/2005 | Agura et al. | 705/14 |
| 2005/0086160 A1 | 4/2005 | Wong et al. | 705/39 |
| 2005/0086167 A1 | 4/2005 | Brake, Jr. et al. | 705/41 |
| 2005/0086177 A1 | 4/2005 | Anderson et al. | 705/64 |
| 2005/0107155 A1 | 5/2005 | Potts et al. | 463/25 |
| 2005/0125343 A1 | 6/2005 | Mendelovich | 705/39 |
| 2005/0149394 A1 | 7/2005 | Postrel | 705/14 |
| 2005/0251446 A1 | 11/2005 | Jiang et al. | 705/14 |
| 2006/0129426 A1 | 6/2006 | Pearson | 705/2 |
| 2006/0161478 A1 | 7/2006 | Turner et al. | 705/14 |
| 2006/0178986 A1 | 8/2006 | Giordano et al. | 705/40 |
| 2006/0195359 A1 | 8/2006 | Robinson et al. | 705/14 |
| 2006/0208060 A1 | 9/2006 | Mendelovich et al. | 235/379 |
| 2006/0208064 A1 | 9/2006 | Mendelovich et al. | 235/380 |
| 2006/0208065 A1 | 9/2006 | Mendelovich et al. | 235/380 |
| 2006/0224451 A1 | 10/2006 | Kerschbrock et al. | 705/14 |
| 2006/0224454 A1 | 10/2006 | Kantor et al. | 705/14 |
| 2006/0249575 A1 | 11/2006 | Turner et al. | 235/380 |
| 2006/0253320 A1 | 11/2006 | Heywood | 705/14 |
| 2006/0259362 A1 | 11/2006 | Cates | 705/14 |
| 2006/0259364 A1 | 11/2006 | Strock et al. | 705/14 |
| 2007/0034700 A1 | 2/2007 | Poidomani et al. | 235/492 |
| 2007/0038515 A1 | 2/2007 | Postrel | 705/14 |
| 2007/0045398 A1 | 3/2007 | Chen | 235/380 |
| 2007/0067642 A1 | 3/2007 | Singhal | 713/186 |
| 2007/0129998 A1 | 6/2007 | Postrel | 705/14 |

(56) References Cited

U.S. PATENT DOCUMENTS

| | | |
|---|---|---|
| 2007/0192178 A1 | 8/2007 | Fung et al. .................. 705/14 |
| 2007/0198352 A1 | 8/2007 | Kannegiesser ................. 705/14 |
| 2007/0215688 A1 | 9/2007 | Routhenstein ................ 235/379 |
| 2007/0239622 A1 | 10/2007 | Routhenstein .................. 705/76 |
| 2007/0257767 A1 | 11/2007 | Beeson ............................ 340/5 |
| 2007/0288371 A1 | 12/2007 | Johnson .......................... 705/41 |
| 2008/0010189 A1 | 1/2008 | Rosenberger ................... 705/39 |
| 2008/0021772 A1 | 1/2008 | Aloni et al. ..................... 705/14 |
| 2008/0021784 A1 | 1/2008 | Hessburg et al. ............... 705/14 |
| 2008/0021785 A1 | 1/2008 | Hessburg et al. ............... 705/14 |
| 2008/0029593 A1 | 2/2008 | Hammad ...................... 235/380 |
| 2008/0040276 A1 | 2/2008 | Hammad ........................ 705/44 |
| 2008/0059303 A1 | 3/2008 | Fordyce .......................... 705/14 |
| 2008/0065555 A1 | 3/2008 | Mullen ............................ 705/75 |
| 2008/0071681 A1 | 3/2008 | Khalid ............................ 705/41 |
| 2008/0099556 A1 | 5/2008 | Park .............................. 235/382 |
| 2008/0103968 A1 | 5/2008 | Bies et al. ....................... 705/39 |
| 2008/0110983 A1 | 5/2008 | Ashfield ........................ 235/382 |
| 2008/0120231 A1 | 5/2008 | Megwa ........................... 705/41 |
| 2008/0121726 A1 | 5/2008 | Brady et al. ................... 235/493 |
| 2008/0148394 A1 | 6/2008 | Poidomani et al. ............. 726/20 |
| 2008/0197201 A1 | 8/2008 | Manessis et al. .............. 235/492 |
| 2008/0201265 A1 | 8/2008 | Hewton ........................... 705/67 |
| 2008/0203152 A1 | 8/2008 | Hammad et al. .............. 235/380 |
| 2008/0230614 A1 | 9/2008 | Boalt ............................ 235/492 |
| 2008/0302869 A1 | 12/2008 | Mullen ......................... 235/380 |
| 2008/0308629 A1 | 12/2008 | Roskind ....................... 235/382 |
| 2009/0006262 A1 | 1/2009 | Brown et al. ................... 705/64 |
| 2009/0045257 A1 | 2/2009 | Maus ............................. 235/382 |
| 2009/0048971 A1 | 2/2009 | Hathaway ...................... 705/41 |
| 2009/0150295 A1 | 6/2009 | Hatch et al. .................... 705/71 |
| 2009/0159663 A1 | 6/2009 | Mullen ......................... 235/379 |
| 2009/0159673 A1 | 6/2009 | Mullen et al. ................. 235/380 |
| 2009/0159682 A1 | 6/2009 | Mullen et al. ................. 235/449 |
| 2009/0159699 A1 | 6/2009 | Mullen et al. ................. 235/493 |
| 2009/0159705 A1 | 6/2009 | Mullen et al. ................. 235/493 |
| 2009/0159707 A1 | 6/2009 | Mullen et al. ................. 235/493 |
| 2009/0164380 A1 | 6/2009 | Brown ............................ 705/65 |
| 2009/0173782 A1 | 7/2009 | Muscato ....................... 235/379 |
| 2011/0029367 A1* | 2/2011 | Olson et al. ................ 705/14.25 |

FOREIGN PATENT DOCUMENTS

| | | | |
|---|---|---|---|
| JP | 2002259876 | 9/2000 | ............ G07B 15/00 |
| JP | 2001243350 | 9/2001 | ............ G06F 17/60 |
| KR | 100457099 | 5/2000 | |
| KR | 100074705 | 6/2002 | |
| WO | WO 0129789 | 4/2001 | ................ G07F 7/02 |

OTHER PUBLICATIONS

"Is Banking Finally Ready for Smart Cards?," American Banker, vol. 157, No. 129, pp. 1(2), Jul. 7, 1992, Jeffrey Kutler.

"One Card Versus Multiple Card Products," Business Credit, vol. 102, No. 5, pp. 40-43, May 2000, Lisa Ruddock.

"PrivaSys Introduces PIN-Driven Secure Card Technology," PR Newswire, May 15, 2001.

"PrivsSys Launches Interactive, Electronic Secure Card and is Chosen for the Prestigious Hot Seat at Demo 2002," PR Newswire, Feb. 11, 2002.

Supplementary European Search Report for Application No. EP03764643, dated Aug. 11, 2006.

International Search Report for Application No. PCT/US03/22018, dated Nov. 5, 2004, mailing date.

* cited by examiner

METHOD AND SYSTEM FOR A MULTI-PURPOSE TRANSACTIONAL PLATFORM

CROSS-REFERENCE TO RELATED APPLICATION

This application is related to U.S. patent application Ser. No. 10/411,192, titled "METHOD AND SYSTEM FOR A MULTI-PURPOSE TRANSACTIONAL PLATFORM," filed Apr. 11, 2003, which is herein incorporated by reference in its entirety.

BACKGROUND OF THE INVENTION

1. Field of the Invention

The present invention relates to the field of consumer accounts, business accounts, and other account types. More particularly, the present invention relates to a method and system for linking source accounts of, for example, demand deposit accounts (DDAs), credit cards, debit cards, stored value cards, ATM cards, loyalty cards, membership cards, and identification cards to a single account platform. This platform and all its linked source accounts can be accessed by a number of potential remote access devices.

2. Description of the Related Art

The ever-bulging wallet is a guaranteed phenomenon in modern-day society. As one traverses through life, one will undoubtedly accumulate numerous things for the wallet. One of those things is the ubiquitous "plastic" in the form of, for example, a credit card, debit card, stored value card, ATM card, phone card, or all of the above. The average consumer has multiple bankcards, private label cards (such as store credit cards, oil/gas credit cards), stored value cards, loyalty cards, membership cards, and identification cards that he/she may carry around. The proliferation of these cards and their associated accounts is adding complexity and inconvenience to consumers' financial lives.

SUMMARY OF THE INVENTION

There exists a need for a vehicle that enables wallet consolidation and facilitates management across a plurality of consumer payment and non-payment accounts provided by one or more issuing entities.

Accordingly, a preferred embodiment provides a method and system that eliminate the need for multiple cards in a consumer's wallet by linking the consumer's payment cards such as credit card(s), debit card(s), stored value card(s) (e.g., subway/metro cards), and ATM card(s), and the consumer's non-payment cards such as loyalty card(s) (e.g., supermarket or drugstore reward program cards), membership card(s) (e.g., video rental and warehouse club cards), and identification card(s) to one consolidated platform that can easily be accessed.

A preferred embodiment provides a method and system for managing funds, through the consolidated platform, across all linked source accounts from various institutions.

A preferred embodiment provides a method and system that give consumers an easy way to access the funds they want to use for any purchase by combining all their payment choices in a single access device or mode, such as a "plastic" card, a phone (cellular or landline), personal digital assistant (PDA), biometric identification (ID), etc.

A preferred embodiment provides a method and system for a multi-purpose device for accessing multiple source accounts via a consolidated platform, and a consumer using such device can choose which payment method the consumer wants to use for a particular transaction. For instance, the consumer can simply input the desired payment choice via a device that accesses his/her source accounts through the consolidated platform.

A preferred embodiment provides a method and system for a multi-purpose accessing device, wherein the consumer having such device has the ability to access and modify personal account information anywhere, anytime from a phone or a data network such as the Internet, so the consumer has the ultimate decision in using the transaction method(s) and/or account(s) that are right for the consumer.

In one embodiment, a method and system for a consolidated platform links to one or more underlying source accounts, wherein each underlying source account is represented by a proxy account number. Multiple proxy account numbers can be pre-loaded onto a device used for accessing the consolidated platform and the underlying source accounts, wherein each number can remain dormant or be activated to associate with one or more of the underlying source accounts.

In one embodiment, a computer-implemented method for performing a transaction comprises receiving, from a point of sale device, a request from a customer to conduct a transaction from an account based on a selection by the customer of a payment option on a card device for the transaction, wherein the request comprises an account number, a discretionary data element to identify the selected payment option, and an amount of the transaction; determining, based on the discretionary data element, the selected payment option; creating a payment file for the transaction; transmitting the payment file for processing; transmitting, to the point of sale device, an authorization for the transaction using the account number; and processing, by a financial institution, the transaction using the selected payment option.

In another embodiment, a computer-implemented method for conducting a transaction comprises receiving, at a point of sale, information from a card device, wherein the information comprises an account number and a discretionary data field, wherein the discretionary data field indicates a selection on the card device of one of a plurality of payment types by a customer; transmitting, to a host entity, the information and a transaction amount, wherein the same account number is transmitted regardless of which payment type is selected by the customer; receiving, from the host entity, an authorization to conduct the transaction using the account number; completing the transaction with the customer at the point of sale using the authorized account number even if the customer selected a payment type for an account having a different account number; and processing, by a host entity, the transaction using the selected payment type.

In yet another embodiment, a payment card device comprises a first button for selecting payment from a first account having a first account number; a second button for selecting payment from a second account having a second account number; and a processor for configuring transaction information to indicate the selection of the first button or the second button, wherein the transaction information includes a transaction account number regardless of whether the first button or the second button was selected.

In another embodiment, a payment card device comprises a plurality of buttons on the payment card device; a first portion of an account number shown on the payment card device; a display for a second portion of the account number on the payment card device, wherein the second portion of the account number is not shown on the display; and a processor for receiving a selection of at least one of the plurality of buttons and instructing the display to display the second portion of the account number based on a proper selection of the at least one of the plurality of buttons.

DETAILED DESCRIPTION OF THE INVENTION

Figure 1:
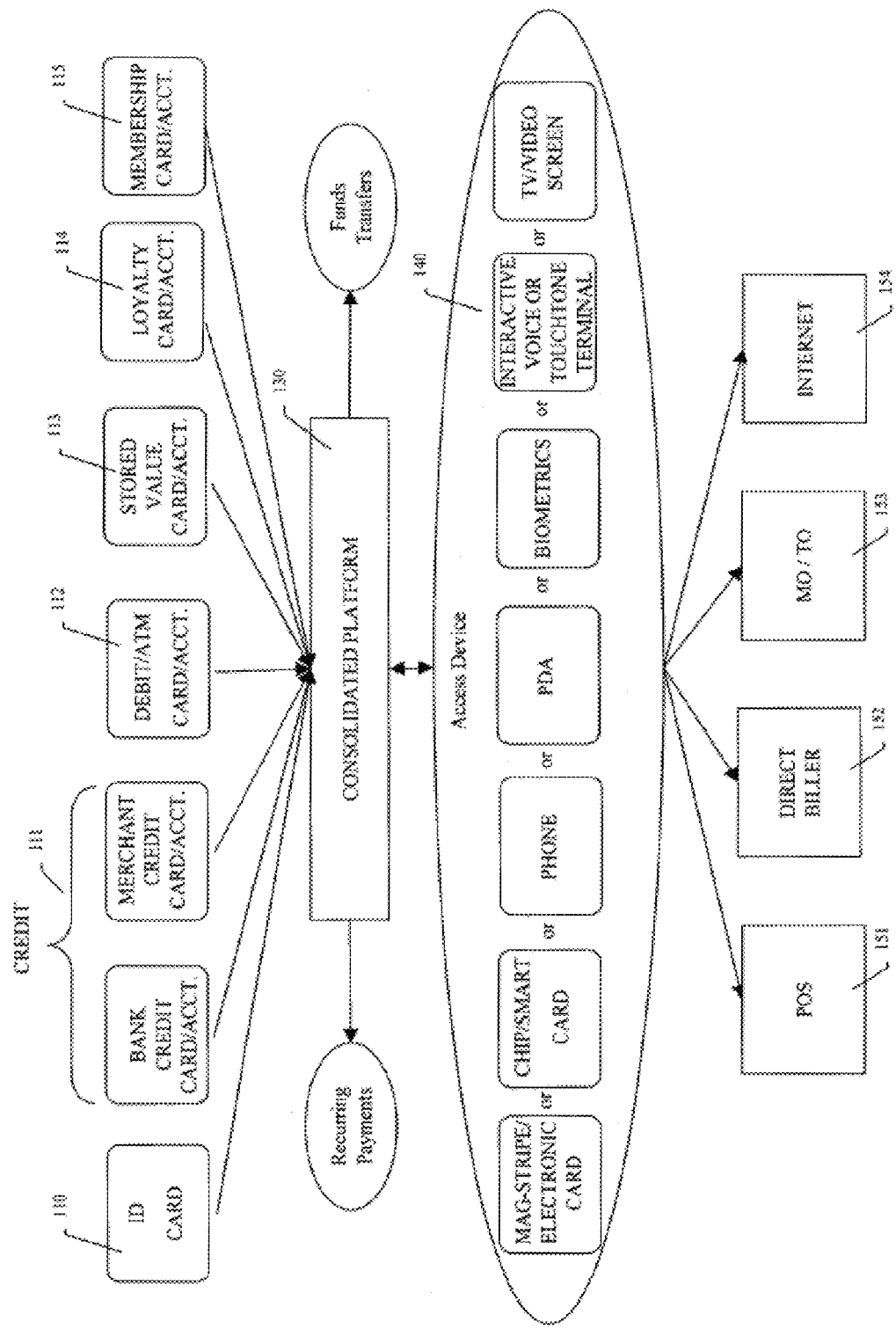
FIG. 1 depicts a system and method for a consolidated platform in accordance with an embodiment of the present invention.

Reference is now made in detail to a preferred embodiment of the present invention, an illustrative example of which is depicted in FIG. 1, showing a system and method for consolidating and accessing consumer payment and non-payment accounts. The term "consumer" or "customer" used herein can be an individual, a group of individuals, a company, or any other entities acting together as one.

According to an embodiment of the present invention, a host entity (e.g., a financial institution) may provide any of its customers with a consolidated platform 130 that may be linked to multiple customer relationships or source accounts that are normally accessed individually by cards or other means. The cards can be, for example, identification card(s) 110, credit card(s) 111, debit/ATM card(s) 112, stored value card(s) 113, loyalty card(s) 114, and/or membership card(s) 115. The source accounts can be provided by one or more account issuers, wherein the host entity can be one of the account issuers. A consumer can access any of his/her source accounts through a single access device or mode 140, such as, but not limited to, a "plastic" card, a phone (cellular or landline), PDA, biometric ID, a key fob, contactless payment sticker, headset or other RFID or near-field communication device, etc. for a transaction at a point-of-sale (POS) or point-of-access (POA) terminal 151, for a mail order (MO) or telephone order (TO) transaction 153, for an Internet transaction 154, for a payment to a direct biller 152, or for a payment using an SMS transmission. The access device can be referred to herein as a card device or a payment card device. In an exemplary configuration, the access device has the dimensions of a conventional credit card and can be read by conventional credit card readers. As their names imply, the POS and POA terminals can be, for example, a card reader at the point of sale such as a supermarket check-out counter, a computer terminal coupled to a communication network for making transactions on-line or accessing accounts, or a telephone for making MO/TO transactions or accessing accounts using voice and/or touchtone signalings. Although some exemplary embodiments describe a point-of-sale device, it is intended that the access device and the consolidated platform can also be used at a point-of-access as well.

An exemplary access device described herein can allow a customer to choose whether to use one of multiple accounts for a transaction from a single access device. The access device can have buttons or other mechanism for a customer to choose an account. Each account can have its own button, or one button can allow the customer to choose from the multiple accounts. Any type of account can be configured as a payment option using the access device. For example, the access device can select from one or more of a credit card account, a line of credit, a loan account, a checking account, a debit account, a savings account, an investment account, a charge card account, and a reward points account.

In one example, the customer can use the access device at a point-of-sale and decide whether to use a checking account or a credit account. A transaction with a checking account results in a debit of the checking account within a few days. A transaction with a credit account gives the customer to opportunity to wait until receiving a credit card statement before paying the outstanding amount. As a result, the access device may provide an option for payment from a checking account or use of a credit account. The access device can have buttons for checking accounts, credit accounts, rewards accounts, or other types of accounts to be used at a point-of-sale.

Figure 4:
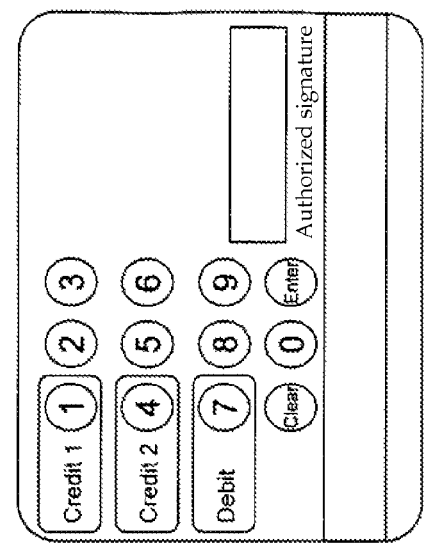
FIGS. 4A-C depict different cards as possible access devices for the consolidated platform, in accordance with an embodiment of the present invention.
Figure 4:
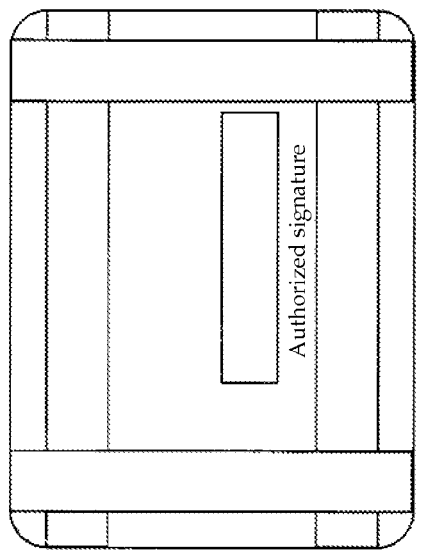
Figure 4:
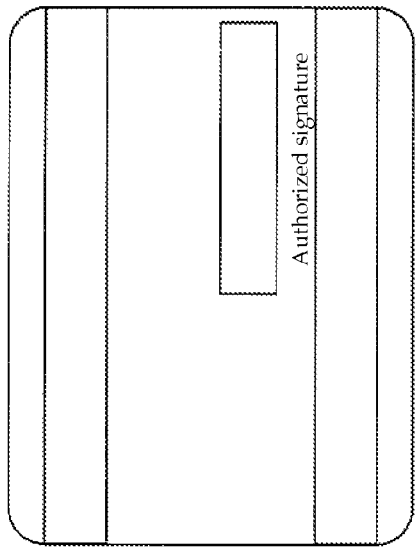
Figure 5A:
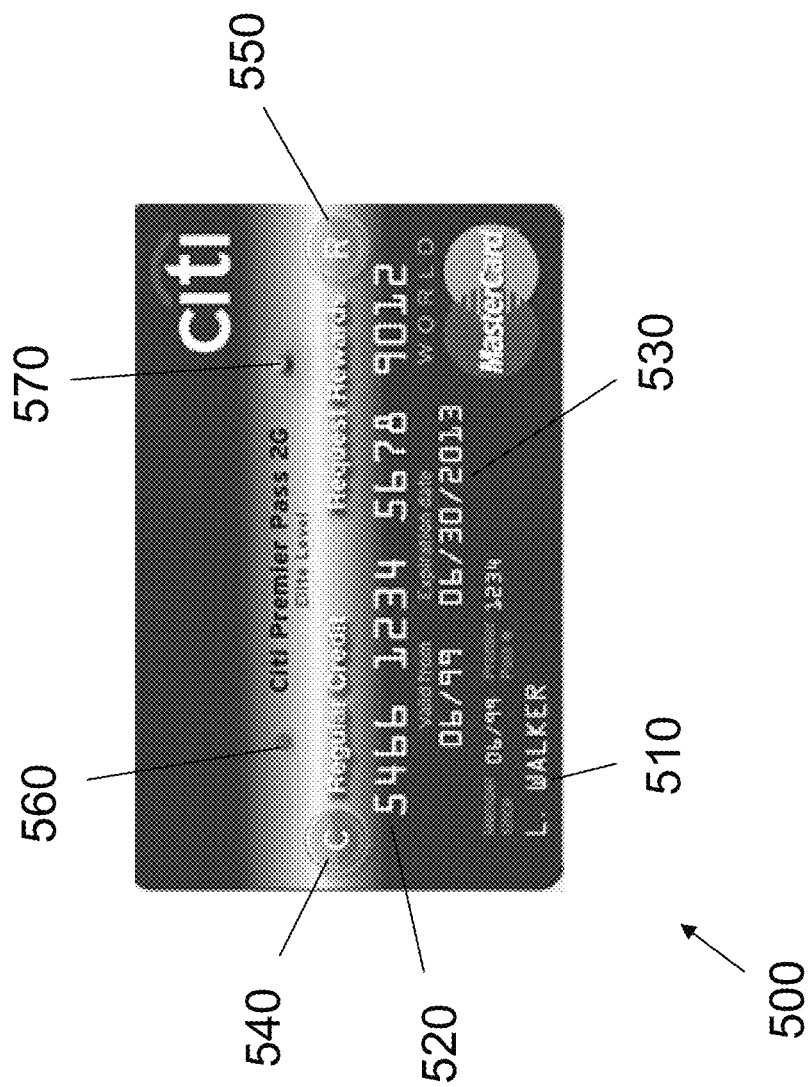
FIGS. 5A-D depict single access devices according to exemplary embodiments.

Referring to FIG. 5A, a single access device 500 is shown according to an exemplary embodiment. In this exemplary embodiment, the single access device 500 has the form factor of a credit card. The access device 500 has a cardholder's name 510, account number 520, and expiration date 530. The other side of the access device, not shown, has a signature block and a stripe or block, similar to the embodiments shown in FIG. 4. The stripe can optionally be programmable, rewritable, magnetic, electronic, RFID, or use any other means for transmitting account information. The access device 500 may also include a processor, a power source (e.g., a battery), an encoder for the stripe, memory, and other circuitry (not shown).

The access device 500 also has at least two buttons. A first button 540 can be labeled with a "C" and can be used for "Regular Credit." A second button 550 can be labeled with an "R" and can be used for "Request Rewards." In this exemplary embodiment, the access device 500 only has two buttons: a credit button 540 and a rewards button 550. However, the access device can have more than two buttons and the buttons can be used for various types of transactions using the access device 500. The buttons can be electronically coupled to a processor (not shown) that is electronically coupled to the stripe for transmitting account information.

When the consumer presses the credit button 540, an indicator light 560 is activated to indicate that credit will be used for the transaction. When the consumer presses the rewards button 550, an indicator light 570 is activated to indicate that rewards will be used for the transaction. When one of the indicator lights 560, 570 is activated, the other indicator light 560, 570 is deactivated so that both indicator lights 560, 570 are not activated at the same time.

In this exemplary embodiment, the consumer has two payment options at a point-of-sale by pressing a button on the access device 500 that corresponds to the desired transaction processing. The consumer can press the credit button 540 so that the transaction is processed as a conventional credit card transaction. Accordingly, the access device 500 will present the account information that corresponds to the consumer's credit card account.

If the consumer presses the rewards button 550, the transaction is processed by a merchant at the point-of-sale as a conventional credit card transaction. A conventional credit card uses one or more tracks of data to facilitate a transaction. These tracks can include information such as account number, field separators, expiration date, service code, discretionary data, and a redundancy check. In an exemplary embodiment, the track has the account information (e.g., account number and expiration date) as well as an element (e.g., one or more letters, numbers, or symbols) in a discretionary data field that indicates that the rewards payment option has been selected. The discretionary data field can be any field on the track that is not required for all transaction processing and is used to differentiate transactions for specific processing. For example, when selecting a rewards transaction, the discretionary data field includes a "1," and when selecting a credit transaction, the discretionary data field is blank or includes a "0." In an alternative embodiment, the discretionary data field can be included on one track and the account information can be provided on a separate track. The merchant at the point-of-sale is not aware of the presence or absence of the element in the discretionary data field. The merchant processes the transaction using a credit account number, whereas the host entity (e.g., a financial institution) processes the transaction using the rewards account that was selected by the customer as the payment mechanism. The payment information includes a credit account for authorizing the transaction through a credit card processing network (e.g., Visa or MasterCard) and a discretionary data field that indicates that the transaction is to be processed using a selected account (e.g., the rewards account). Regardless of the selected payment option by the customer, the transaction is processed by the merchant using one account number, preferably a credit account number, and the host entity knows which account to use in the backend processing.

Upon transaction settlement, the host entity can identify the element in the discretionary data field and process the transaction as a rewards redemption request. If the consumer has sufficient rewards currency available for redemption in the consumer's rewards account, then the transaction can be settled using rewards currency. The host entity authorizes the transaction for the merchant, which appears to the merchant as a credit transaction. However, the host entity processes the transaction using the account selected by the customer (e.g., the rewards account). A statement credit can be posted to the consumer's credit account. If the consumer does not have sufficient rewards currency, the transaction can be settled from the consumer's credit card account.

Figure 5B:
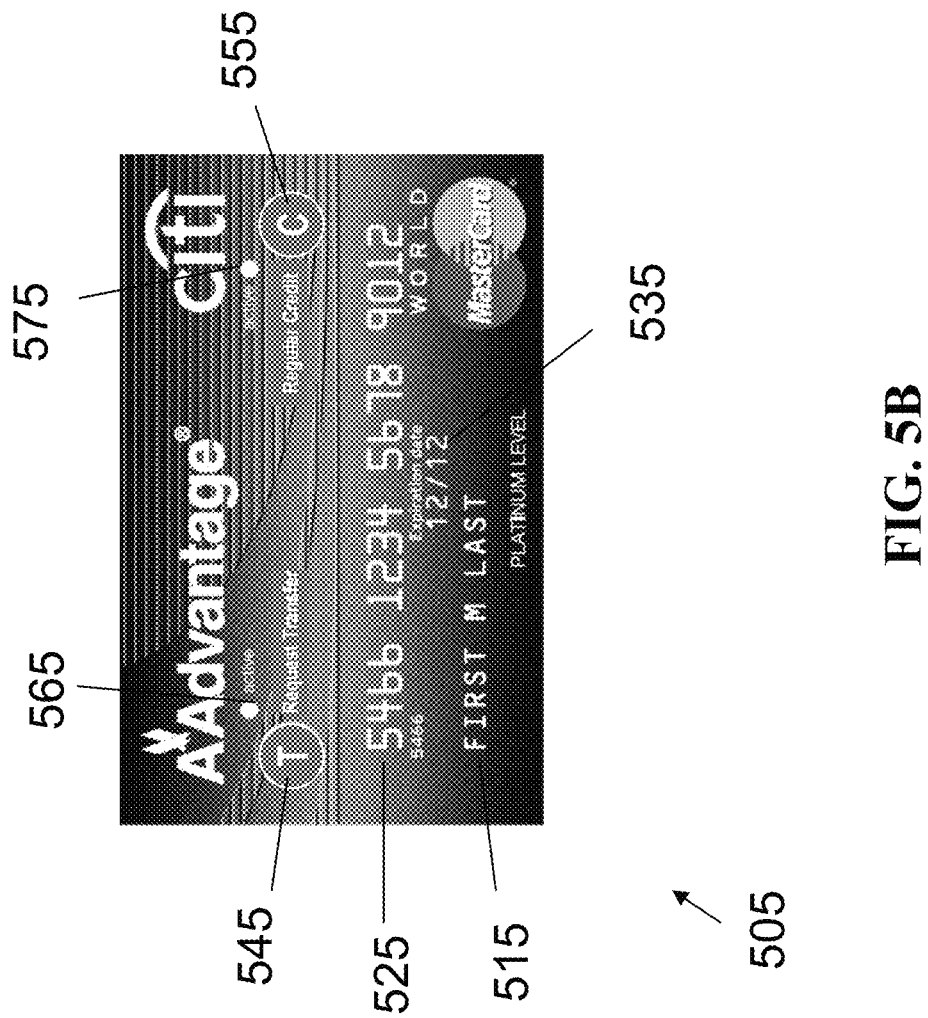

Referring to FIG. 5B, a single access device 505 is shown according to an alternative embodiment. The access device 505 has a cardholder's name 515, account number 525, and expiration date 535. The other side of the access device, not shown, has a signature block and a stripe or block, similar to the embodiments shown in FIG. 4. The stripe can optionally be programmable, rewriteable, magnetic, electronic, RFID, or use any other means for transmitting account information. The access device 505 may also include a processor, a power source (e.g., a battery), an encoder for the stripe, memory, and other circuitry (not shown).

The access device 505 also has at least two buttons. A first button 545 can be labeled with a "T" and can be used for "Request Transfer." A second button 555 can be labeled with an "C" and can be used for "Regular Credit." In this exemplary embodiment, the access device 505 only has two buttons: a transfer button 545 and a credit button 555. However, the access device can have more than two buttons and the buttons can be used for various types of transactions using the access device 505. The buttons can be electronically coupled to a processor (not shown) that is electronically coupled to the stripe for transmitting account information.

When the consumer presses the transfer button 545, an indicator light 565 is activated to indicate a request for a transfer. When the consumer presses the credit button 555, an indicator light 575 is activated to indicate that credit will be used for the transaction. When one of the indicator lights 565, 575 is activated, the other indicator light 565, 575 is deactivated so that both indicator lights 565, 575 are not activated at the same time.

In this embodiment, the consumer has two payment options at a point-of-sale by pressing a button on the access device 505 that corresponds to the desired transaction processing. The consumer can press the credit button 555 so that the transaction is processed as a conventional credit card transaction. Accordingly, the access device 505 will present the account information that corresponds to the consumer's credit card account.

Alternatively, the consumer can request an Automated Clearing House (ACH) funds transfer from a credit account linked to a checking account for an ACH funds transfer. The consumer presses the transfer button 545, and the transaction is processed by a merchant at the point-of-sale as a conventional credit card transaction. The track containing the credit card account information also includes an element (e.g., one or more letters, numbers, or symbols) in a discretionary data field that indicates that the transfer payment option has been selected. The merchant at the point-of-sale is not aware of the presence or absence of the element in the discretionary data field. Upon transaction settlement, the host entity can identify the element in the discretionary data field and process the transaction as an ACH funds transfer request and debit the appropriate checking account.

Figure 5C:
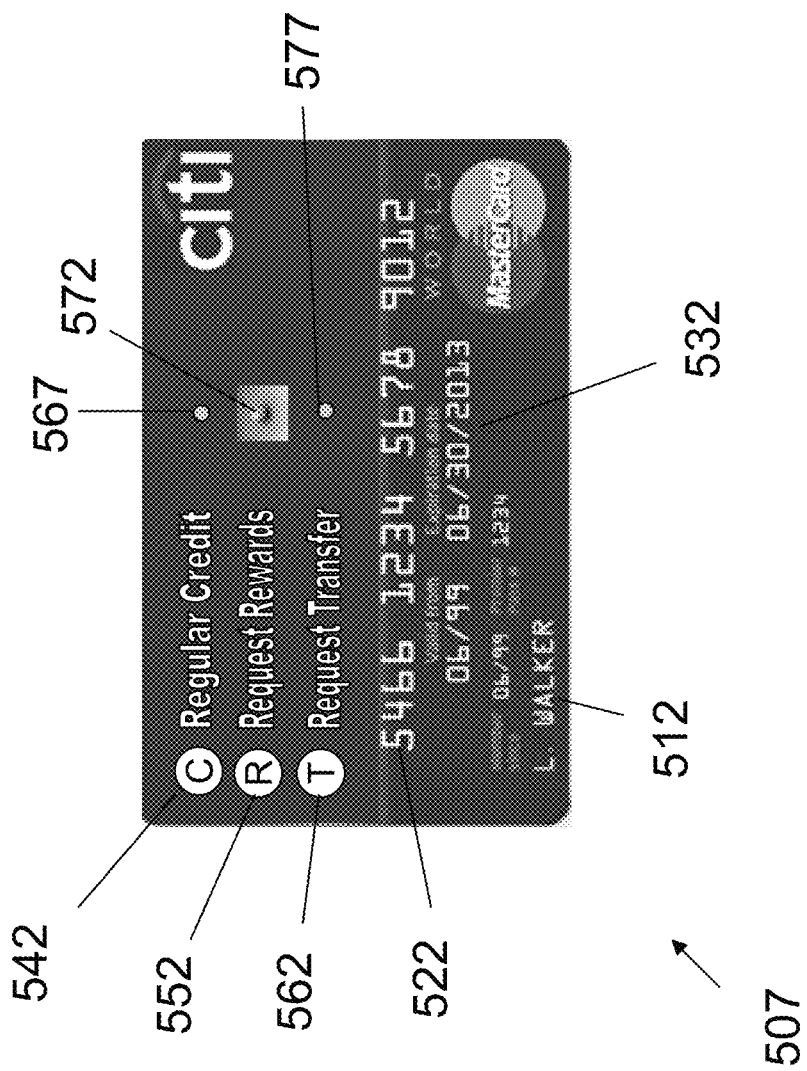

Referring to FIG. 5C, a single access device 507 is shown according to an exemplary embodiment. In this exemplary embodiment, the single access device 507 has the form factor of a credit card. The access device 507 has a cardholder's name 512, account number 522, and expiration date 532. The other side of the access device, not shown, has a signature block and a stripe or block, similar to the embodiments shown in FIG. 4. The stripe can optionally be programmable, rewritable, magnetic, electronic, RFID, or use any other means for transmitting account information. The access device 507 may also include a processor, a power source (e.g., a battery), an encoder for the stripe, memory, and other circuitry (not shown).

The access device 507 also has at least three buttons. A first button 542 can be labeled with a "C" and can be used for conventional credit. A second button 552 can be labeled with an "R" and can be used to request use of rewards. A third button 562 can be labeled with a "T" and be used to request a transfer. In this exemplary embodiment, the access device 507 has three buttons: a credit button 542, a rewards button 552, and a transfer button 562. However, the access device can have more than three buttons and the buttons can be used for various types of transactions using the access device 507. The buttons can be electronically coupled to a processor (not shown) that is electronically coupled to the stripe for transmitting account information.

When the consumer presses the credit button 542, an indicator light 567 is activated to indicate that credit will be used for the transaction. When the consumer presses the rewards button 552, an indicator light 572 is activated to indicate that rewards will be used for the transaction. When the consumer presses the transfer button 562, an indicator light 577 is activated to indicate that a transfer was requested. When one of the indicator lights 567, 572, 577 is activated, the other indicator lights 567, 572, 577 are deactivated so that not more than one indicator light is not activated at the same time.

In this exemplary embodiment, when a consumer selects a button for completing a transaction, the access device 507 transmits or allows the reading of transaction information, including the account number 522 and a discretionary data element. In this example, the account number 522 is a credit account number. A processor in the access device 507 can allow the entry of a digit in the discretionary data element field once the consumer activates one of the buttons. If the consumer selects credit button 542, the discretionary data element is a "0." If the consumer selects rewards button 552, the discretionary data element is a "1." If the consumer selects transfer button 562, the discretionary data element is a "2." The merchant seeks authorization of the account number 522 regardless of which button was selected. However, in obtaining authorization, the merchant passes along the discretionary data element to a host entity for authorizing and processing the transaction.

In one embodiment, the customer can activate the access device by entering a personal identification number (PIN) to enhance the security of the access device. As shown in FIG. 4C, the access device can have a keypad or other input mechanism for entering a number, letter, or character into the access device for verification of the customer in order to proceed with a transaction. A server at the host entity can verify the entry of the correct PIN. Alternatively, a processor on the access device can authenticate the user based on the PIN entry.

In another embodiment, upon entry of a PIN, the access device can display a portion or all of a selected account number. The display can be an LED, LCD, or other screen known in the art for presenting information on a credit card. Also, upon verification of the PIN, the access device can appropriately complete the track for the transaction information with the account number and any discretionary fields. The transaction information can then be communicated to the point-of-sale.

Figure 5D:
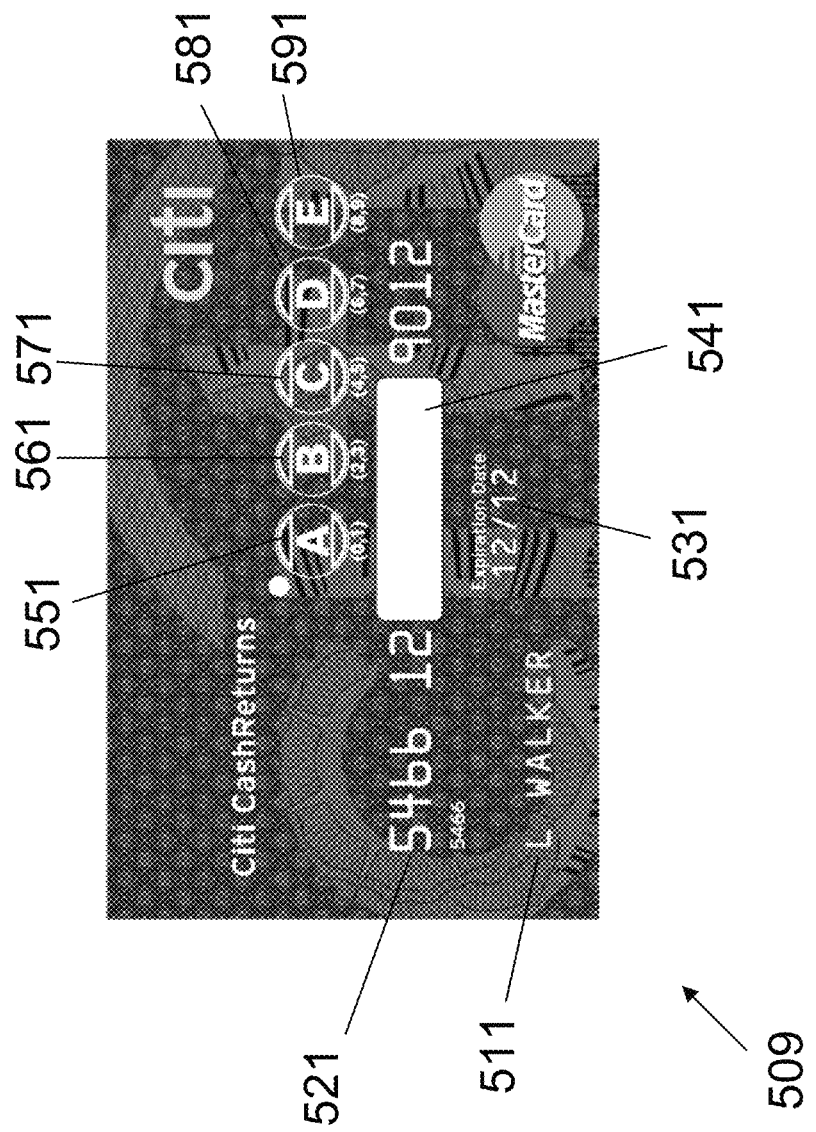

Referring to FIG. 5D, an access device 509 is shown. In this exemplary embodiment, the access device 509 has the form factor of a credit card. The access device 509 has a cardholder's name 511, account number 521, and expiration date 531. The other side of the access device, not shown, has a signature block and a stripe or block, similar to the embodiments shown in FIG. 4. The stripe can optionally be programmable, rewritable, magnetic, electronic, RFID, or use any other means for transmitting account information. The access device 509 may also include a processor, a power source (e.g., a battery), an encoder for the stripe, memory, and other circuitry (not shown). The features described on access device 509 can be used separately from or in combination with other embodiments described herein.

The access device 509 also has five buttons 551, 561, 571, 581, 591. Each button can be labeled, such as with a letter, as shown in the exemplary embodiment, where access device 509 has button A 551, B 561, C 571, D 581, E 591. In addition to or instead of the alphabetic character, each button can represent a numerical character or multiple numerical characters. In this exemplary embodiment, button A 551 can be used for "0" and "1," button B 561 can be used for "2" and "3," button B 571 can be used for "4" and "5," button D 581 can be used for "6" and "7," and button E 591 can be used for "8" and "9." In one example of using the buttons, a cardholder can press button A 551 once for "0" and twice for "1."

The buttons 551, 561, 571, 581, 591 can be used to complete a blank field 541 in the account number 521. In this exemplary embodiment, the account number 521 has 16 digits, but only 10 are printed or embossed on the access device 509. So the cardholder has to unlock a code to allow the access device to display the remaining six digits on the field 541. When a cardholder desires to use the access device 509 at a point of sale, whether physically present at a merchant or online, the cardholder enters an unlocking code on the access device 509. The cardholder depresses one or more of the buttons 551, 561, 571, 581, 591 to activate the field 541. The unlocking code can be a selection of one button, multiple buttons, simultaneous selection of multiple buttons, multiple depressions of a single button, or some other combination of the buttons to achieve a secure unlocking code. The blank field 541 can be a display, such as an LCD display. When the unlocking code is properly entered, a processor (not shown) can determine whether the proper code was entered and have the field 541 display the remaining digits of the account number 521. When the unlocking code is not properly entered, the field 541 can remain blank or include an indication that the wrong code was entered. The field 541 can display the remaining digits of the account number 521 for a predetermined period of time to enable the cardholder to complete the transaction. In an alternative embodiment, the cardholder can depress a button to hide the digits on field 541. In yet another alternative embodiment, the access device 509 can hide the digits on field 541 after a certain step in the transaction, such as after the merchant receives authorization.

The merchant performs an initial authorization and checks the credit line, as is customarily done in conventional credit card transactions. The transaction is transparent to the merchant, and a transaction from any account appears as a typical credit card transaction at the point-of-sale.

In the exemplary embodiment, the access device uses a credit card number as the banking account number that is transmitted from the merchant's point of sale to the host entity regardless of which payment type is selected by the customer on the access device. However, any banking account number can be used as the account number. For example, a debit card number can be used for each transaction regardless of the chosen payment type. In another example, a proxy account number can be used for each transaction regardless of the chosen payment type. The access device can use an expiration date that is associated with the account number or another expiration date associated with the customer's accounts.

The host entity and/or each customer may initiate the linking process in order to set up the consolidated platform. A customer wishing to sign up can contact the host entity via telephone, Internet, or any other means of communication that can convey the customer's wish to the host entity. In this interaction, the customer may be prompted to register each source account by providing each source account number, the account issuer of the source account, and any other relevant information relating to the source account that can be used to link it to the consolidated platform. For instance, once contacted by the customer to set up a consolidated platform, the host entity can offer to automatically register all host entity-branded accounts and/or other accounts affiliated with or issued by the host entity. Next, the host entity can prompt the customer to register other accounts not branded or affiliated with the host entity. The host entity can also prompt the customer to select one of the registered accounts as the default account to be used for a transaction when no account choice is made or possible for such transaction.

Figure 6A:
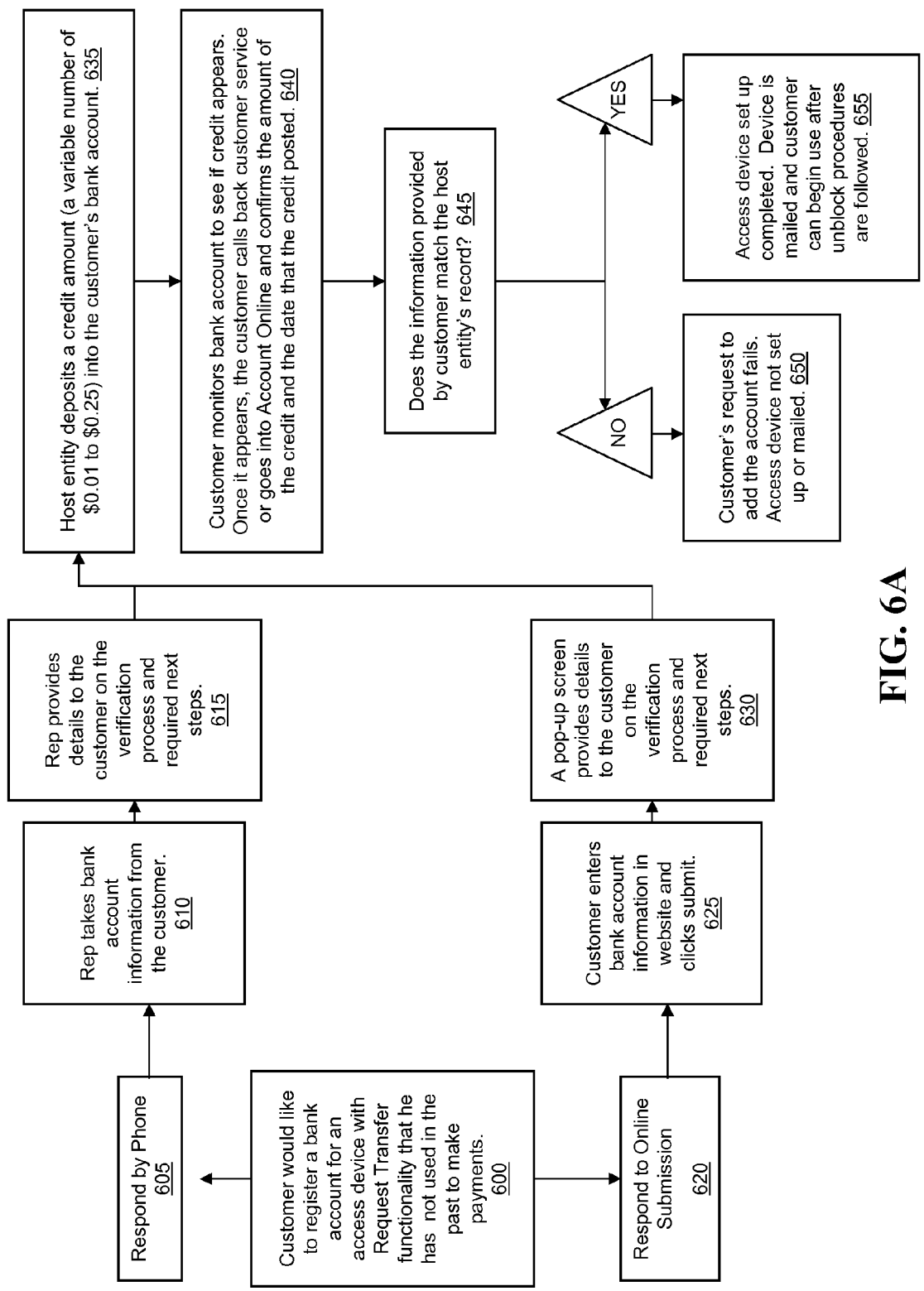
FIGS. 6A and 6B depict a verification process according to an exemplary embodiment.

Referring to FIG. 6A, a "request transfer" functionality account verification process is shown. Although "request transfer" verification is shown, the process for "request rewards" or other type of transaction processing is substantially similar. This exemplary process shows how to validate a checking account for an ACH funds transfer. This verification process can occur when configuring the access device and as part of an enrollment process. As a result, no further verification is needed when the access device is used at a point-of-sale.

In 600, a customer desires to register a bank account with an access device having "request transfer" functionality that has not been used in the past to make payments. A host entity can handle the registration request via phone or online. In 605, the host entity responds to the registration request by phone. In 610, representative of the host entity takes account information from the customer. In 615, the representative provides details to the customer on the verification process and required next steps.

In 620, the host entity responds to the registration request that is submitted online. In 625, the customer enters bank account information into a website and clicks "submit." In 630, a pop-up screen provides details to the customer regarding the verification process and required next steps.

In 635, the host entity deposits a credit amount (e.g., a variable number of $0.01 to $0.25) into the customer's bank account. In 640, the customer monitors the bank account to see if the credit appears. Once it appears, the customer calls back customer service or visits the online website to confirm the amount of the credit and the date that the credit posted. In 645, the host entity determines whether the information provided by the customer matches the host entity's record. In 650, if the information does not match, then the customer's request to add the account fails. The access device will not be set up or mailed. In 655, if the information matches, then the host entity sets up the access device. The access device is mailed to the customer, who can begin use after following unblock procedures. Once the customer has registered one or more accounts with the access device, the host entity can link the registered accounts to a credit card number or other transaction account number that will be used in authorizing each transaction. But when processing the transaction, the host entity will know to use the registered account(s) based on the customer's selection of a payment type (e.g., checking account, rewards account) at a point of sale.

Figure 6B:
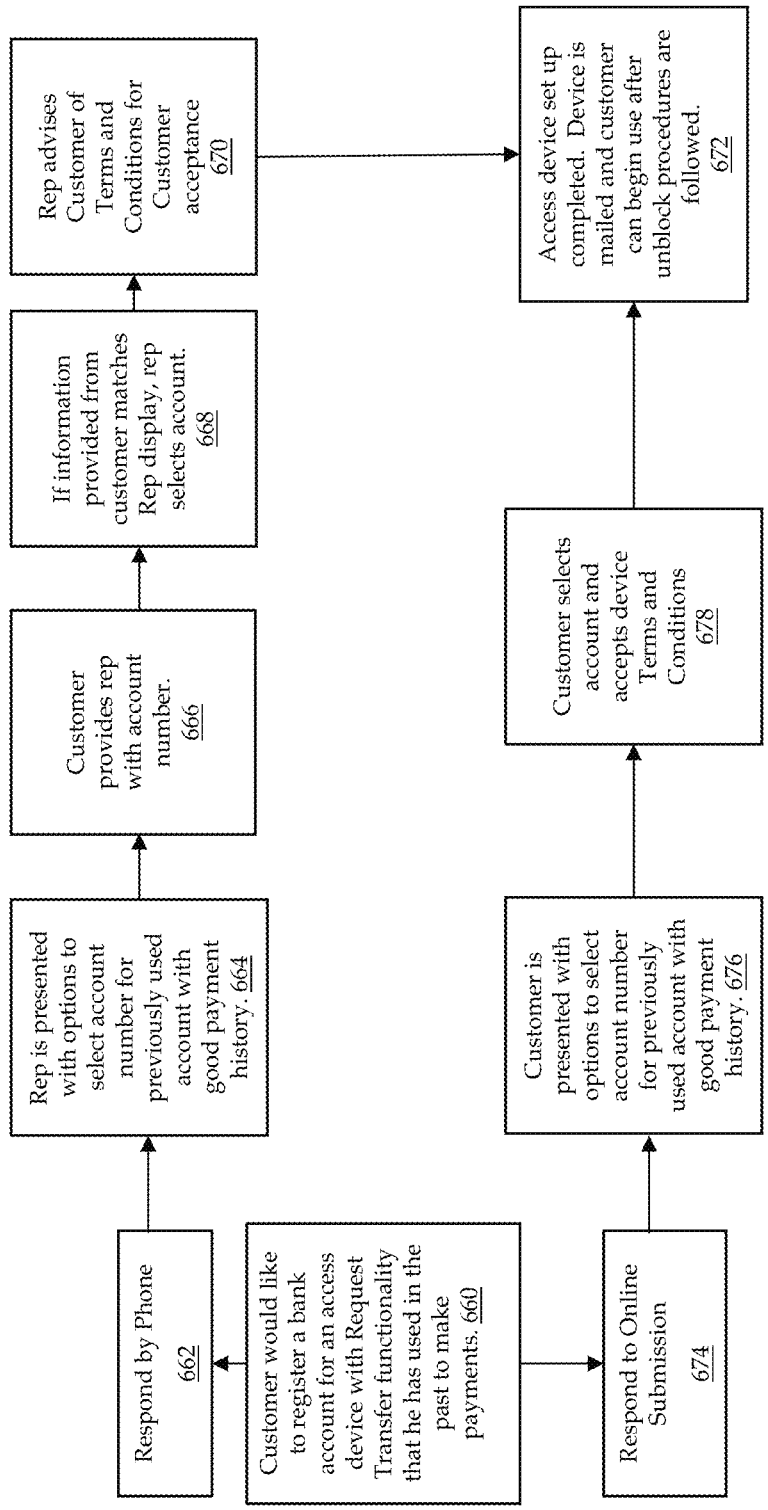

Referring to FIG. 6B, a "request transfer" functionality account verification process is shown where the customer already has an account that has been used for payments. In 660, the customer would like to register a bank account for an access device with "Request Transfer" functionality that he has used in the past to make payments. The customer can register by phone or using an online submission.

In 662, the customer can register by phone. In 664, a customer service representative is presented with options to select the account number for the previously used account if the previously used account has a good payment history. The customer service representative asks the customer for the account number. Alternatively, the customer service representative can access a listing of a customer's accounts and confirm the selection of an account. In 666, the customer provides the customer service representative with the account number of the previously used account. In 668, if the information provided from the customer matches the information on the customer service representative's display, then the customer service representative selects the appropriate account. in 670, the customer service representative advises the customer of the terms and conditions for customer acceptance. In 672, the access device set up is completed. The access device is mailed to the customer and the customer can begin using the access device after unblock procedures are followed.

In 674, the customer can register using an online submission. In 676, the customer is presented with options to select the account number for a previously used account having a good payment history. In 678, the customer selects the account and accepts the terms and conditions for the access device. Once the customer accepts the terms and conditions, the process continues to set up completion 672.

Figure 2:
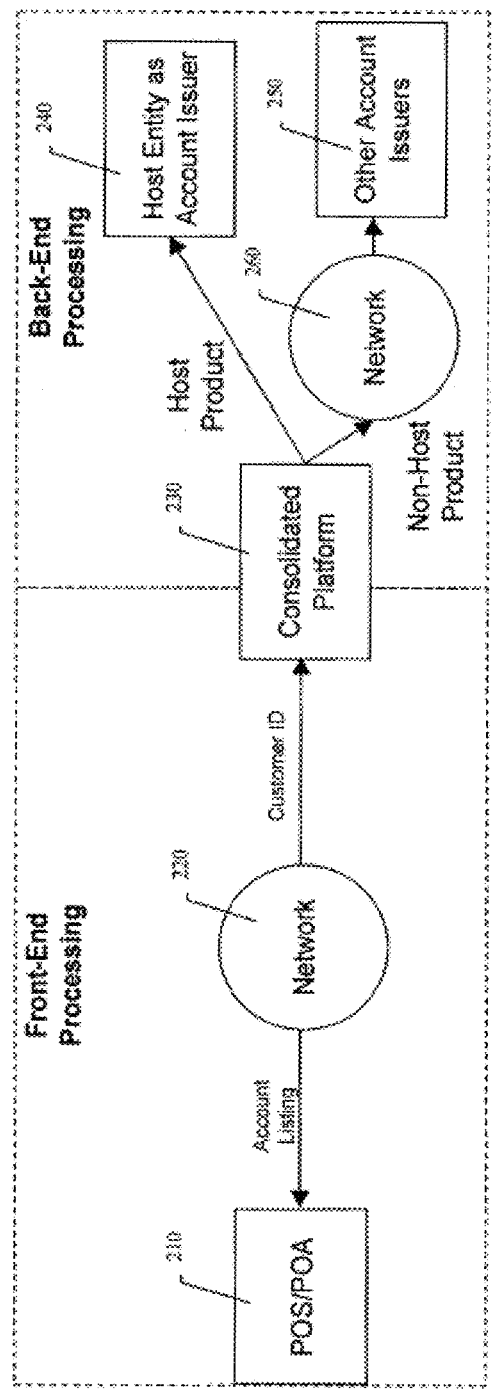
FIG. 2 depicts a high-level diagram of the functionality of a consolidated platform that employs a customer identification to access underlying accounts, in accordance with an embodiment of the present invention.

According to the preferred embodiments of the present invention, the host entity can set up the consolidated platform by creating such platform and an associated identifier that links to one or more of the customer's various source accounts. In an embodiment, the associated identifier can be a customer identification (ID) assigned to each customer. The customer ID enables the consolidated platform of the present invention to identify the particular customer and activate the customer's account listing for selection. The account selection can be dependent on technology advancement at point of sale (POS) or point of access (POA) that allows for account selection. The associated account number can also include a unique bank identification number (BIN) to indicate that it is a consolidated platform number of the present invention. FIG. 2 provides a high-level depiction of the functionality of a consolidated platform that employs a customer ID number to access various underlying accounts. Here, the customer can use an access device to communicate the customer ID to a POS or POA terminal 210 for a transaction. The customer also can directly enter the customer ID into an input device (e.g., a keypad) located at the POS/POA terminal 210 without using an access device. The POS/POA terminal 210 then relays the customer ID to a participating terminal or payment network 220, which identifies the customer ID as being associated with the consolidated platform and routes it to the consolidated platform 230 maintained by the host entity. Based on the customer ID, the consolidated platform 230 returns an associated account listing, such as the one shown in Table 1, to the customer at the POS/POA terminal 210 via the network 220. The customer can then select an account from the account listing using the input device at the POS/POA terminal 210, which relays the account selection to the consolidated platform 230 via the network 220.

Alternatively, the customer can communicate both the customer ID and information about a selected account (again, via an access device or an input device located at the POS/POA terminal 210) without having to receive the account listing from the consolidated platform 230 for account selection. In one exemplary embodiment, the information about the selected account can be a discretionary data element communicated along with an account number, which can be used as a customer ID. For example, the use of a "0" as a discretionary data element can represent the selection of a credit account, and the use of a "1" can represent the use of a rewards account. It should be noted that the customer ID can be set up as desired by the host entity to have any number of characters, and each character can be any alphabet letter, numeric character, or symbol.

TABLE 1

Customer ID-based Account Table

| ID | Accounts | Institution |
|---|---|---|
| 1234 = B. Smith | 1. Debit - 7890 | Bank X |
|  | 2. Credit - 2121 | Bank Y |
|  | 3. Credit - 3333 | Bank Z |

In another alternative embodiment, the customer can use a credit card account number or other banking account number as a customer ID. The host entity can identify the accounts associated with the credit card account number. For example, the host entity can identify a rewards account or a checking account associated with the credit card account. When a discretionary data field uses a pre-determined element, the host entity can determine which of the associated accounts should be used to process the transaction.

Through the consolidated platform 230, the host entity can approve/authorize the transaction and settle the transaction internally when the selected account is administered by the host entity at system 240. In this case, the consolidated platform 230 and the system 240 can be parts of the host entity's host processing system, which can include processing units, databases and/or servers to process information received from the POS/POA terminal in a manner apparent to those skilled in the art based on the present disclosure. If the selected account is administered by an external entity other than the host entity at system 250, such as another financial institution (FI), the host entity can settle the transaction externally via a network 260, such as the Automated Clearing House (ACH), executed against the selected account of an external account issuer. As understood in the art, the ACH makes periodic sweeps against external account issuers to clear respective selected accounts passed on by the consolidated platform 230. Settlement networks other than the ACH, e.g., MasterCard, Visa, AmEx, Discover, Diner's Club) can also be set up and/or used for authorization, settlement and/or clearance of funds between accounts, and they can be the same or different from the network 220 that was used to initiate the transaction. The host entity can also directly settle the transaction with an external account issuer if the host entity and the external account issuer have direct contacts and/or agreements with one another.

Figure 3:
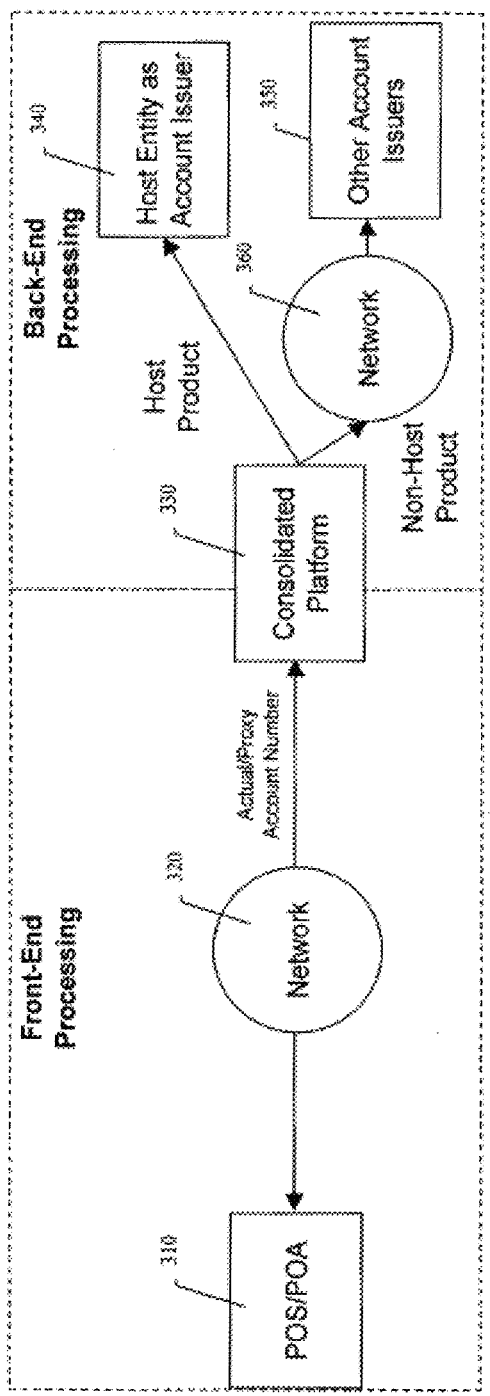
FIG. 3 depicts a high-level diagram of the functionality of a consolidated platform that employs actual or proxy (actual/proxy) account numbers to access underlying accounts, in accordance with an embodiment of the present invention.

Alternative to the customer-ID based consolidated platform, within the consolidated platform the host entity can associate each underlying source account with an identifier that can be the source account's actual account number or a representative proxy account number. In this embodiment, the associated identifier represents a particular one of the underlying source accounts and not the particular customer having those underlying source accounts. Again, the actual/proxy account number can have a credit or checking/debit BIN number, depending on the type of underlying account and access device design, to identify it as an actual/proxy account number of a consolidated platform. FIG. 3 provides a high-level depiction of the functionality of a consolidated platform that employs actual/proxy account numbers to access various underlying accounts, in accordance with an embodiment of the present invention. Here, the customer can use an access device to communicate the actual or proxy account number to the POS/POA terminal 310 for a transaction. For example, the account number can be an actual credit account number. The customer also can directly enter the actual/proxy account number into an input device (e.g., a keypad) located at the POS/POA terminal 310 without using an access device. The POS/POA terminal 310 then relays the actual/proxy account number to a participating terminal or payment network 320, which identifies the account as part of a consolidated platform and routes it to the consolidated platform 330 maintained by the host entity. The terminal/payment network 320 can be an industry-standard terminal/payment network (e.g., Visa, MasterCard, AmEx, Discover, Diner's Club, NYCE, Star), and the actual/proxy account number can be compatible with such network.

If the consolidated platform 330 receives from the network 320 a host-issued actual account number (e.g., a credit card account number), the consolidated platform 330 can authorize the transaction for the merchant, and, if that account was selected for the transaction, then the consolidated platform 330 can route the settlement of the actual account number internally within the host entity's system at 340. If the consolidated platform 330 receives from the network 320 an actual account number that is issued by an external entity other than the host entity, the consolidated platform 330 can route the account number and transaction information to the external account issuer for settlement via any external network 360 that is typically used by the external account issuer (e.g., Visa, MasterCard, AmEx, Discover, Diner's Club, NYCE, Star). Alternatively, the network 320 can receive an actual account number that is issued by an external entity other than the host entity, bypass the consolidated platform 330, and route the actual account number and transaction information to the external account issuer 350 for settlement. The consolidated platform or host entity can authorize the transaction for the merchant using the actual (or proxy) account number, but the account number processed for settlement of the transaction is based upon the selection by the customer and is indicated by the discretionary data element. Once the customer makes the selection, the merchant can processes the account number (i.e., the account number of the card), but the consolidated platform and host entity recognize (e.g., through the use of a discretionary data element) that the customer selected a different account for settlement (e.g., a checking account or rewards account).

If the consolidated platform 330 receives a proxy account number, it first performs a proxy account matching using a proxy account matching table, such as the one shown in Table 2, to obtain the actual source account number. It should be noted that the proxy account number can be set up as desired by the host entity to have any number of characters, and each character can be any alphabet letter, numeric character, or symbol. Once the matching is completed, the consolidated platform 330 can authorize the transaction and route the settlement of the actual account number internally within the host entity's system 340 or externally at 350 with a settlement network 360 as described earlier.

TABLE 2

Proxy Account Matching Table

| Proxy | Source Account | Institution |
|---|---|---|
| 1212 = | 5389 | Host entity |
| 1234 = | 7890 | Bank X |
| 4567 = | 7889 | Bank Y |

The settlement network 360 can be the same or different from the network 320 that was used to initiate the transaction. Also, the consolidated platform 330 and the system 340 can be parts of the host entity's host processing system, which can include processing units, databases and/or servers to process information received from the POS/POA terminal in a manner apparent to those skilled in the art based on the present disclosure.

A cardholder's account information, including the accounts linked to the card device, is stored at the host entity or card issuer. Alternatively, the cardholder's account information can be stored on the consolidated platform and extracted or requested by the host entity. In one embodiment, the consolidated platform can be part of or co-located with the host entity or other account issuer.

At the point of sale, transaction information can include an amount, an account number for the card (e.g., a credit account number embossed on the card), and a designation of an account selection using a discretionary data element. The account number may be an actual account number, such as an account number for a credit card account, or the account number may be a proxy number for the host entity. When a proxy number is used, the merchant can process the transaction using the proxy number, but the host entity uses the proxy number and the discretionary data element to determine which account to use to settle the transaction. The merchant can receive, read, or generate a record with the transaction information and pass the transaction information along to the host entity. While the merchant receives information that includes a selection of an account for payment, the host entity processes the transaction using the selected account. From the merchant's point of view, the account number of the card is used regardless of the selected account. From the host entity's point of view, the merchant is provided with authorization to conduct the transaction using the account number of the card, but the host entity debits or credits the appropriate accounts based on the account selected by the cardholder.

The preferred embodiments of the present invention anticipate that a variety of access devices may be used to access the consolidated platform and its underlying source accounts via communication networks such as the Internet or other data networks. One advantage of the use of customer ID and actual/proxy account numbers is that they can be used on a variety of devices as such devices are adopted over time by the customers for transactions (e.g., at POS). In other words, the customer ID and actual/proxy account numbering schemes can be independent of the type of access device used. Possible access devices or mechanisms include but are not limited to: computer terminals, landline phones, cellular phones, PDAs, magnetic-stripe cards (e.g., electronic card device or card with multiple magnetic stripes), chip cards (i.e., smart cards), biometric ID technology, televisions, touch screens, video terminals, and interactive voice and/or touchtone terminals. The customer ID and actual/proxy account numbers can be pre-loaded onto, for example, payment applications residing in any of these access devices, and each proxy account number can be linked within the host entity's system to any underlying source account through the consolidated platform.

When the access device is a computer terminal, a landline or cellular phone, a PDA, a chip card or any other electronic storage device, the customer can enter the customer ID or actual/proxy account number into such access device (or retrieve the number if it already has been entered and stored in the access device) for transmission to the consolidated platform in transaction settlements. The customer can enter the particular customer ID or actual/proxy account number with a keyboard or keypad associated with the access device. Here, the access device and the POS/POA terminal can be one and the same; for example, a customer using a computer terminal to purchase products on-line with the customer ID or actual/proxy account number entered or stored therein. The information transmission to the consolidated platform can be done at the POS/POA terminal, through the Internet or another data network, using landline (wired) or wireless (e.g., infra-red or radio-frequency) communication as understood in the art.

When the access device is a magnetic-stripe card, the customer can store the customer ID or actual/proxy account numbers on the card, which can be swiped at a POS/POA terminal for transmission of such numbers to the consolidated platform in transaction settlements. For storage of a customer ID number, the magnetic-stripe card can have a single magnetic stripe that stores the customer ID number in a typical manner known in the art for conventional credit cards, ATM/debit cards, and the like. For storage of a plurality of actual/proxy account numbers, the magnetic-stripe card can have a plurality of magnetic-stripes arranged at different locations on the card. Each magnetic stripe stores a particular actual/proxy account number, and the customer can choose a particular account number to use for a transaction by swiping the corresponding magnetic stripe on the card at the POS/POA terminal. FIGS. 4A and 4B show examples of a card having two magnetic stripes and a card having four magnetic stripes, respectively, that can be used in the present invention. Alternatively, the magnetic stripe card can have a single magnetic area at a single location on the card and associated electronics for magnetic simulation or dynamic magnetic encoding that enables the card to output different actual/proxy account numbers or a customer ID (with or without different link data to indicate a chosen account number) at the POS/POA terminal. FIG. 4C shows an example of the card. With such card, the customer can choose a particular account number to use for a transaction by entering the account choice via a keypad or switch(es) located on the card itself, and the magnetic area can output the corresponding account number at the POS/POA terminal.

When the access device employs biometric ID technology, the customer ID can be based on a biometric scan, such as a fingerprint scan or an iris scan. Such biometric technology is as understood in the art. Thus, the customer can access an account list from the consolidated platform or further enter an account selection in the access device or in an input device at the POS/POA terminal in order to perform a transaction by first providing a biometric scan at a POS/POA terminal during the transaction.

As mentioned earlier, the consolidated platform provides the matching capability so that when the host entity receives a transaction through or performed with one of the proxy account numbers, that number will be matched/associated with an underlying source account against which the host entity can execute settlement.

Another advantage of proxy account numbers is the elimination of the need to replace cards. Because multiple proxy account numbers can be pre-loaded onto each access device, some numbers can be activated while some remain dormant on the access device. Hence, when the customer changes or adds one or more of the underlying source accounts, such modification can be changed in the host entity's system by reassigning, activating, and/or deactivating the pre-loaded proxy account numbers to match the newly-amended underlying source accounts. Still another advantage of proxy account numbers is the ease with which a customer can obtain a consolidated platform for access to multiple other accounts. This is because the customer only has to provide information about source accounts to be linked, and the set-up can be performed by the host entity.

According to the preferred embodiments of the present invention, a customer can choose a desired payment method at a POS terminal (or a point-of-access terminal) via the access device. There are multiple choices of payment that the access device can have: 1) credit, 2) checking non-cash back, 3) checking with ATM/cash-back, and 4) rewards currency. Credit represents lines of credit and their proxy account numbers, and the customer can select a particular credit account from one or more lines of credit available to him/her for credit payments. These credit accounts have corresponding credit proxy account numbers that are pre-loaded onto the access device as explained earlier. The access device will then send the corresponding credit proxy account number (with credit BIN) to the POS terminal. This transaction can be processed by the terminal and payment networks (e.g., MasterCard, Visa, AmEx, Discover, Diner's Club) as credit transactions are conventionally processed. The host entity then receives from the payment networks the transaction for authorization and settles based on the normal authorization criteria for the source account that corresponds to the credit proxy account. The settlement can be done internally within the host entity's system or externally through an outside settlement network as described below.

Another payment method, checking non-cash back, represents a transaction against a checking account when no cash back is received, wherein a proxy account number can be used for the checking account. Hence, for a checking transaction at a POS or POA where cash-back is not received, the access device can send a corresponding checking proxy number with a credit BIN to the POS terminal. Again, the corresponding checking proxy account number is pre-loaded onto the access device as explained earlier. This transaction can be processed in a similar manner to an off-line (i.e., signature-based) debit transaction, and it is then routed to the host entity for settlement. The host entity can approve and settle the transaction internally or externally as described earlier.

Another payment method, checking with ATM/cash-back, represents an ATM or cash-back checking transaction (e.g., check card or debit card with cash-back option) and its actual account number that is linked to a checking account. Here, an ATM or cash-back checking transaction at POS or point of access can be processed using the actual account number. Thus, a proxy account number will not be used, and the transaction will be processed over the regional Electronic Funds Transfer (EFT) networks (e.g. Cirrus, Plus). The customer will be prompted for a PIN, and the transaction will be authorized accordingly over the EFT network(s). The customer can then receive the desired or allowable cash back from the transaction. Alternatively, a proxy account number can also be used for the checking with ATM/cash-back transaction in the same manner described earlier with regard to the other two methods, with the exception that the customer can receive the desired or allowable cash-back from the transaction. Also, it should be noted that other names may be used to represent the respective functionalities of the aforementioned payment choices as well. The ATM/cash-back transaction type where a customer can receive cash from a checking account differs from a redemption transaction whereby the customer receives cash by redeeming points from a rewards account.

The proxy account numbers in any or all of the above payment methods can be structured in an infinite number of ways to distinguish among themselves. For instance, each proxy account number may have one or a plurality of digits or characters that are different from other proxy account numbers. Alternatively, one or more digits can be added or deleted at the end of a base account number common to all proxy account numbers in order to form a proxy account number that is unique from other proxy account numbers and the consolidated account number. The particular proxy account number can be selected via the access device by an entity involved in a transaction with such proxy account number.

In one example, the proxy account number can be a credit card account number. Along with each transaction, based upon a selection by the consumer on the access device, the access device transmits the credit card account number along with one or more digits or characters that indicate the type of transaction processing requested by the consumer. The absence or presence of the digit or character can indicate to the host entity that the consumer desires to use the credit card account, a rewards account, a checking account, or other type of account.

According to the preferred embodiments of the present invention, a default account (e.g., credit, DDA) may be selected by the customer for association with the primary account number that can be displayed on the access device. This primary account number may be used for mail order (MO), telephone order (TO), or Internet transactions. In the case of a plastic card access device, the primary account number may be embossed on the card, and that number can be used for imprinting at a manual (imprinter) POS. For example, in the embodiment shown in FIGS. 5A and 5B, the primary account number is a credit card number that is embossed or printed on the access device. In one alternative, another banking account number or a proxy number can be embossed or printed on the access device. As yet another alternative, a separate application may be used on the Internet that replicates the proxy account schema in the on-line environment.

According to the preferred embodiments of the present invention, customers who have linked multiple source accounts to a single consolidated platform can transfer funds across accounts and different financial institutions. Potential types of fund transfers include, but are not limited to, balance transfers and recurring payments. The consolidated platform can also provide a consolidated statement of activities and balances of the underlying source accounts that can be used for budgeting and financial planning.

Although the consolidated platform has been described as an account to underlying payment accounts, it should be understood that such account can also be a "gateway" account to non-payment accounts (e.g., merchant loyalty accounts, membership accounts, and identification accounts) as well as payment accounts. For underlying non-payment accounts, each can be represented by a proxy account having a non-payment proxy account number.

Once the customer chooses an appropriate button on the access device for a desired payment account, the transaction information includes an indication of the selected payment account. The transaction information can also include the account number and an expiration date. The merchant performs an initial authorization against the credit line, which is conventionally done with all credit card transactions. The selection of the payment account is transparent to the merchant, as all transactions appear as a typical credit card transaction at the point-of-sale. So the merchant performs the initial credit authorization, even if the customer indicated a payment with a checking account.

If the customer indicated the use of a checking account, the transaction will be processed for an ACH transfer. The credit interchange is collected and settlement proceeds as usual by the merchant. If there are insufficient funds in the checking account, the transaction can be processed as a credit transaction and billed at the next cycle. In this instance, the credit interchange is collected and settlement proceeds as usual by the merchant. At the host entity (e.g., a credit card issuer or other financial institution), checking account purchases can be presented in a separate section on a credit card statement, as well as including the payment in the section for "Payments, Credits, and Adjustments."

Figure 7:
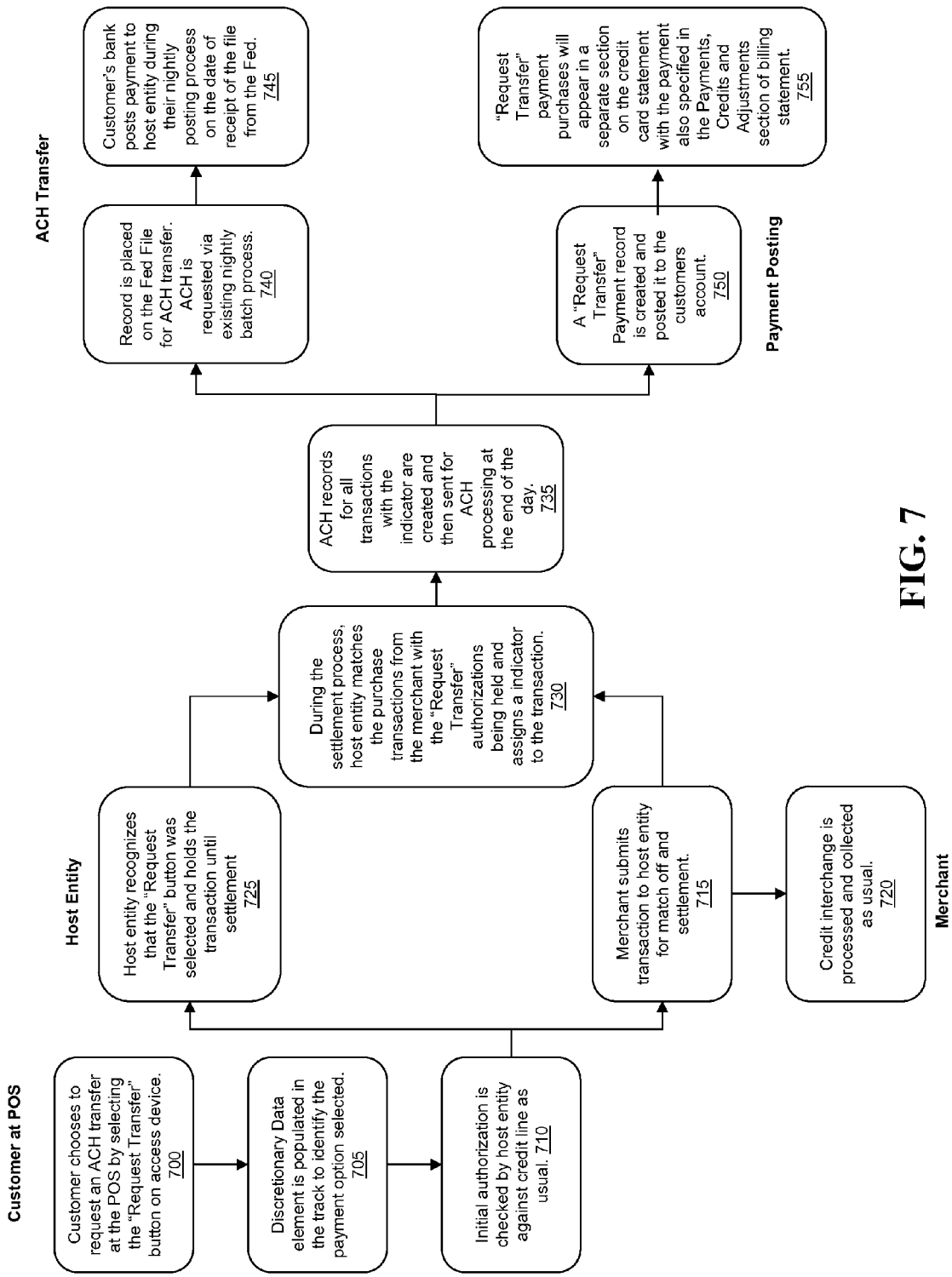
FIG. 7 depicts a process whereby the customer pressed a "request transfer" button on an access device according to an exemplary embodiment.

Referring to FIG. 7, a method is shown for processing a transaction whereby the customer pressed a "request transfer" button on an access device at the point-of-sale. As described above with respect to FIG. 5, the "request transfer" button allows the customer to use the access device to process the transaction as an ACH funds transfer from a checking account, and the merchant is able to process the transaction as a credit card transaction. When the "request transfer" button is selected, the transaction can be initially processed using the credit card account number on the card, but the payment will be processed using the checking account for payment via the Automated Clearing House. Two separate activities occur when the customer presses "request transfer." First, the transaction is authorized against the credit line. Second, the payment for the same amount is deducted from the ACH account. When the payment is received, the payment goes against the outstanding balance on the credit line.

At the point-of-sale, in 700, the customer chooses to request an ACH funds transfer from a checking account by selecting the "request transfer" button on the access device. In 705, a discretionary data element is populated in the track to identify the payment option selected. The track can also include an account number and an expiration date. This information (the discretionary data element, account number, and expiration date) is transmitted from the access device to the point of sale device. The point of sale device can transmit the information, including other information about the transaction (e.g., transaction amount) to a host entity. In 710, initial authorization is checked by a host entity (e.g., a credit card issuer) against a credit line for that customer.

In 715, a merchant at the point-of-sale submits the transaction to the host entity for matching authorization against settlement to ensure that the settlement amount is the same as the authorized amount. In some instances (e.g., leaving a tip at a restaurant or pumping gas), the settlement amount may exceed the authorized amount, but the settlement amount may be approved according to pre-defined business rules. In 720, the credit interchange is processed and collected as usual by the merchant. In 725, the host entity recognizes that the "request transfer" button was selected and holds the transaction until settlement.

In 730, during the settlement process, the host entity matches the purchase transactions from the merchant with the "request transfer" authorizations being held and assigns an indicator to the transaction. In 735, ACH records for all transactions with the indicator are created and then sent for ACH processing at the end of the day.

In 740, the ACH record is placed on the Federal Reserve ("Fed") File for ACH transfer. ACH is requested via a nightly batch process. If settlement occurs too late on a Friday or over a weekend, the ACH would be requested on the Fed File via a nightly batch process on the next Monday. In 745, the customer's bank posts payment to the host entity during their nightly posting process on the date of receipt of the file from the Federal Reserve. An ACH item on a Friday will not be posted by the customer's bank until the Monday night posting process.

In 750, a "request transfer" payment record is created and posted to the customer's account. If the ACH is returned as insufficient funds (NSF), the request transfer payment will be reversed. The original purchase transaction will remain on the customer's account as a regular credit charge. As a result, the host entity can benefit from the consolidated platform by having the credit card account to charge in the instance of insufficient funds. In 755, "request transfer" payment purchases can appear in a separate section on a credit card statement as well as the section for "Payments, Credits, and Adjustments."

Figure 8:
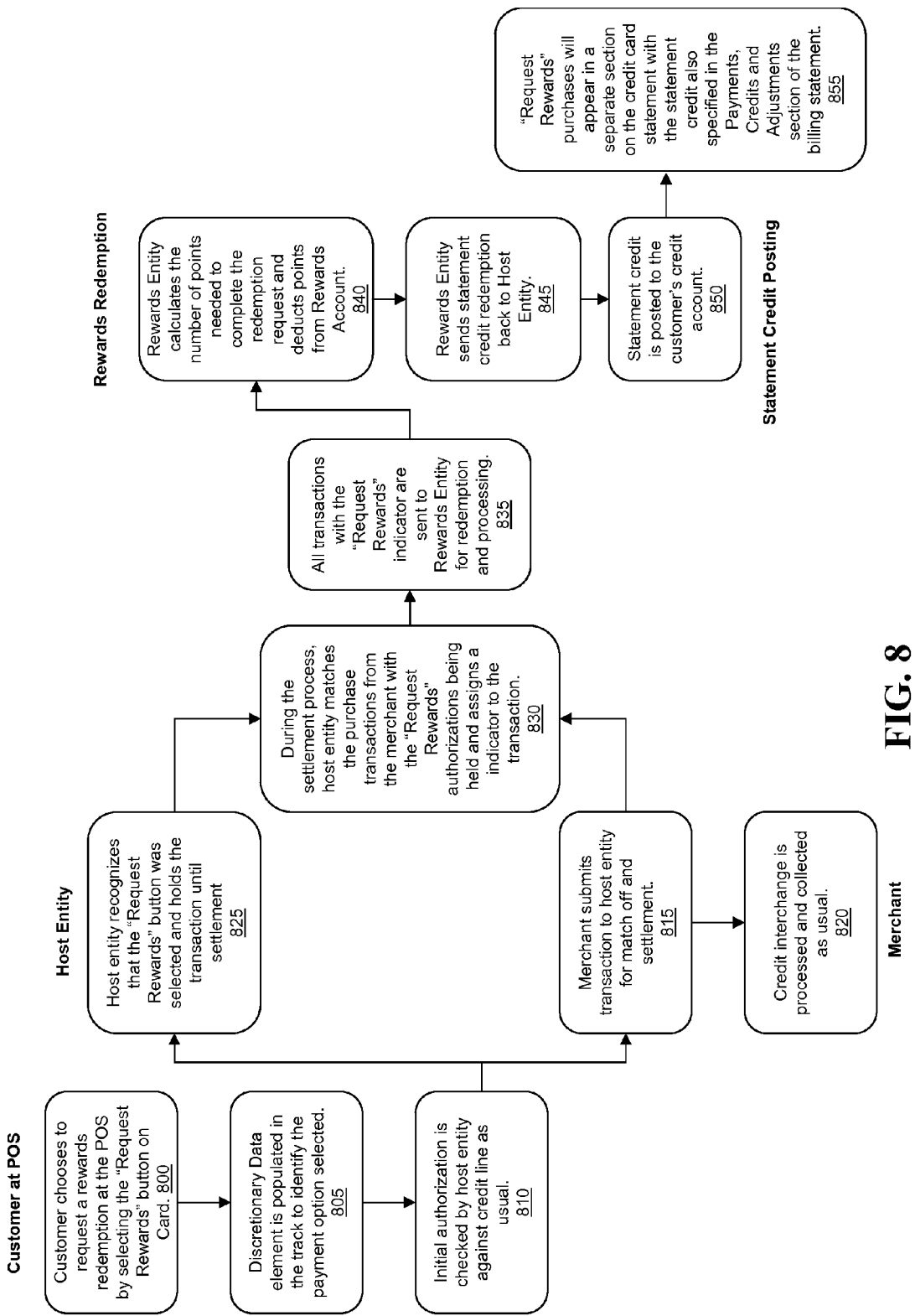
FIG. 8 depicts a process whereby the customer pressed a "request rewards" button on an access device according to an exemplary embodiment.

Referring to FIG. 8, a method is shown for processing a transaction whereby the customer pressed a "request rewards" button on an access device at the point-of-sale. As described above with respect to FIG. 5, the "request rewards" button allows the customer to use the access device to process the transaction by redeeming rewards currency, and the merchant is able to process the transaction as a credit card transaction. When the "request rewards" button is selected, the transaction can be initially processed using the credit card account number on the card, but the payment will be processed by redeeming points in the rewards account.

At the point-of-sale, in 800, the customer chooses to request a rewards redemption by selecting the "request rewards" button on the access device. In 805, a discretionary data element is populated in the track to identify the payment option selected. In 810, initial authorization is checked by a host entity (e.g., a credit card issuer) against a credit line for that customer.

In 815, a merchant at the point-of-sale submits the transaction to the host entity for match off and settlement. In 820, the credit interchange is processed and collected as usual by the merchant. In 825, the host entity recognizes that the "request rewards" button was selected and holds the transaction until settlement.

In 830, during the settlement process, the host entity matches the purchase transactions from the merchant with the "request rewards" authorizations being held and assigns an indicator to the transaction. In 835, all transactions with the "request rewards" indicator are sent to a rewards entity for processing.

In 840, the rewards entity calculates the number of points needed to complete the redemption request and deducts points from the customer's rewards account. In 845, the rewards entity sends a statement credit redemption back to the host entity. In 850, the statement credit is posted to the customer's credit account. Settlement and posting credits to accounts are only done Monday through Friday. Any statement credits from the rewards entity that are sent for posting on Friday or Saturday will not be processed until Monday and will not be posted until Tuesday morning. In 855, "request rewards" purchases can appear in a separate section on a credit card statement as well as the section for "Payments, Credits, and Adjustments."

Figure 9:
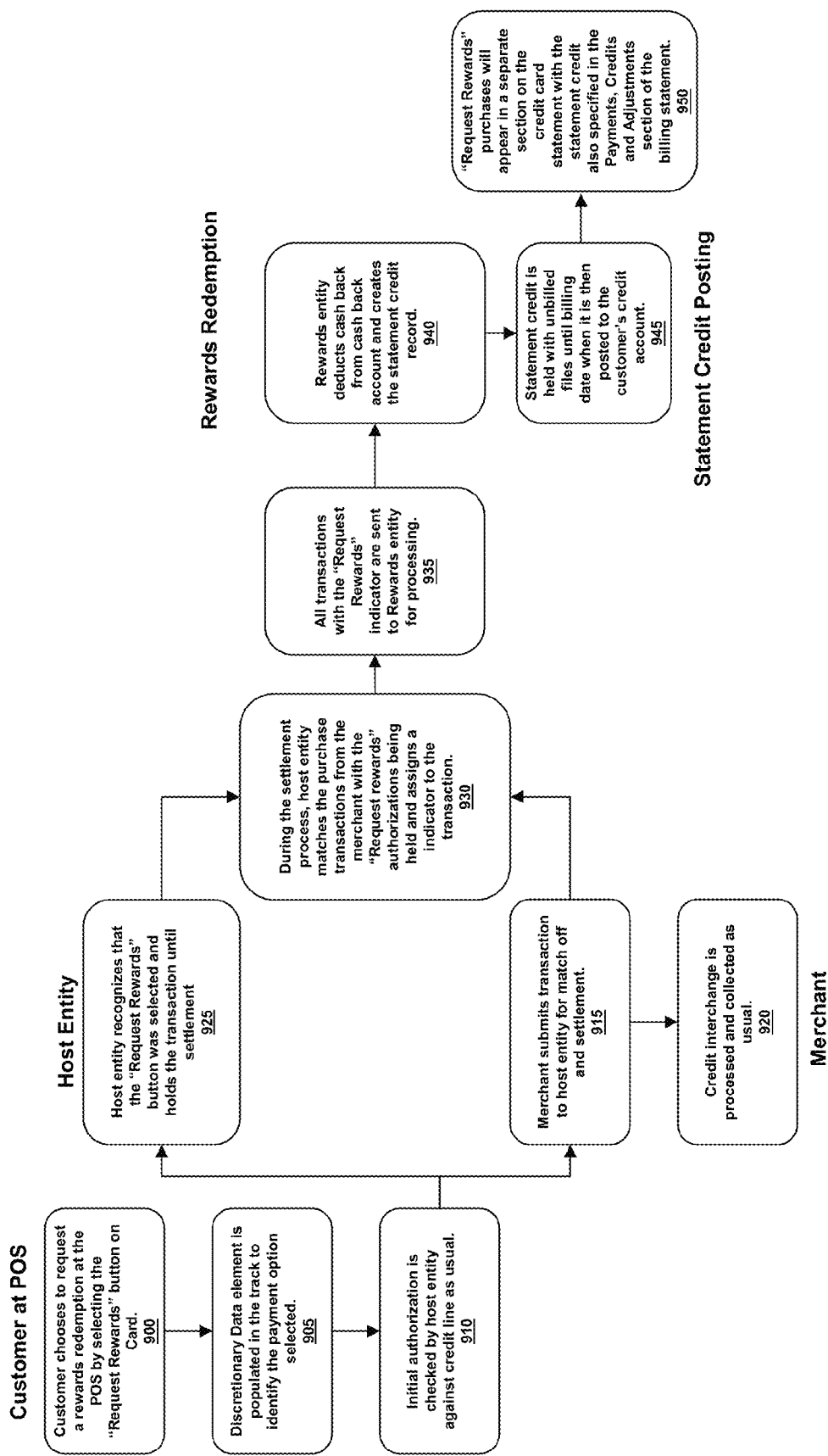
FIG. 9 depicts a process whereby the customer pressed a "request rewards" button on an access device according to an alternative exemplary embodiment.

Referring to FIG. 9, a method is shown for processing a transaction whereby the customer pressed a "request rewards" button on an access device at the point-of-sale. As described above with respect to FIG. 5, the "request rewards" button allows the customer to use the access device to process the transaction by redeeming rewards currency and receive cash back, and the merchant is able to process the transaction as a credit card transaction.

At the point-of-sale, in 900, the customer chooses to request a rewards redemption by selecting the "request rewards" button on the access device. In 905, a discretionary data element is populated in the track to identify the payment option selected. In 910, initial authorization is checked by a host entity (e.g., a credit card issuer) against a credit line for that customer.

In 915, a merchant at the point-of-sale submits the transaction to the host entity for match off and settlement. In 920, the credit interchange is processed and collected as usual by the merchant. In 925, the host entity recognizes that the "request rewards" button was selected and holds the transaction until settlement.

In 930, during the settlement process, the host entity matches the purchase transactions from the merchant with the "request rewards" authorizations being held and assigns an indicator to the transaction. In 935, all transactions with the "request rewards" indicator are sent to a rewards entity for processing.

In 940, the rewards entity deducts cash back from a cash back account and creates the statement credit record. In 945, the statement credit is held with unbilled files until a billing date. On the billing date, the statement credit is posted to the customer's credit account. Settlement and posting credits to accounts are only done Monday through Friday. Any statement credits from the rewards entity that are sent for posting on Friday or Saturday will not be processed until Monday and will not be posted until Tuesday morning. In 950, "request rewards" purchases can appear in a separate section on a credit card statement as well as the section for "Payments, Credits, and Adjustments."

The methods and systems described herein can be implemented by various specially-programmed computers across a network. A host entity can have one or more servers for receiving and processing requests using payments and rewards. A rewards entity, such as the Citi Thank You Network, can also include one or more servers for receiving and processing rewards requests. The host entity and the rewards entity can be communicatively coupled with each other and a merchant over a network, such as the internet. At the merchant's location, the merchant can use a point of sale device, such as a card reader, that is communicatively coupled to a server of the host entity for processing a transaction.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

What is claimed is:

1. A payment card device comprising:
   a first button on the payment card for selecting payment from a first account having a first account number;
   a second button on the payment card for selecting payment from a second account having a second account number; and
   a processor on the payment card for configuring transaction information to indicate the selection of the first button or the second button, wherein the transaction information includes a transaction account number regardless of whether the first button or the second button was selected.

2. The payment card device according to claim 1, wherein the transaction account number is a credit account number.

3. The payment card device according to claim 1, wherein the first account is selected from the group consisting of a credit card account, a line of credit, a loan account, a checking account, a debit account, a savings account, an investment account, a charge card account, and a rewards account.

4. The payment card device according to claim 3, wherein the second account is selected from the group consisting of a credit card account, a line of credit, a loan account, a checking account, a debit account, a savings account, an investment account, a charge card account, and a rewards account.

5. The payment card device according to claim 1, further comprising a first indicator light to indicate when the first button is selected and a second indicator light to indicate when the second button is selected.

6. The payment card device according to claim 1, wherein the transaction information further comprises a discretionary data field including an element that indicates the selection of the first button or the second button.

7. The payment card device according to claim 1, further comprising an input for entering a personal identification number.

8. The payment card device according to claim 1, wherein the transaction account number is the first account number.

9. A payment card device comprising:
   a plurality of buttons on the payment card device;
   a first portion of an account number shown on the payment card device;
   a display for a second portion of the account number on the payment card device, wherein the second portion of the account number is not shown on the display; and
   a processor for receiving a selection of at least one of the plurality of buttons and instructing the display to display the second portion of the account number based on a proper selection of the at least one of the plurality of buttons.

10. A payment card device comprising:
    a first button on the payment card for selecting payment from a first account having a first account number;
    a second button on the payment card for selecting payment from a second account having a second account number; and
    a processor on the payment card for configuring transaction information to indicate the selection of the first button or the second button, wherein the transaction information comprises a discretionary data field including an element that indicates the selection of the first button or the second button.

11. The payment card device according to claim 10, wherein the first account is selected from the group consisting of a credit card account, a line of credit, a loan account, a checking account, a debit account, a savings account, an investment account, a charge card account, and a rewards account.

12. The payment card device according to claim 10, wherein the second account is selected from the group consisting of a credit card account, a line of credit, a loan account, a checking account, a debit account, a savings account, an investment account, a charge card account, and a rewards account.

13. The payment card device according to claim 10, further comprising a first indicator light to indicate when the first button is selected and a second indicator light to indicate when the second button is selected.

14. The payment card device according to claim 10, further comprising an input for entering a personal identification number.

15. The payment card device according to claim 10, wherein the transaction information further comprises a transaction account number regardless of whether the first button or the second button was selected.

16. The payment card device according to claim 15, wherein the transaction account number is a credit account number.

17. The payment card device according to claim 15, wherein the transaction account number is the first account number.

* * * * *